United States Patent
Inoue et al.

(10) Patent No.: US 9,182,601 B2
(45) Date of Patent: Nov. 10, 2015

(54) OPTICAL DEVICE

(75) Inventors: Akira Inoue, Yokohama (JP); Kenichiro Takahashi, Yokohama (JP); Tomohiko Kanie, Yokohama (JP); Michiko Harumoto, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 640 days.

(21) Appl. No.: 13/523,472

(22) Filed: Jun. 14, 2012

(65) Prior Publication Data

US 2012/0328238 A1 Dec. 27, 2012

(30) Foreign Application Priority Data

Jun. 17, 2011 (JP) ................. P2011-135239
Apr. 4, 2012 (JP) ................. P2012-085659
Apr. 11, 2012 (JP) ................. P2012-090292

(51) Int. Cl.
G02B 6/26 (2006.01)
G02B 27/09 (2006.01)
G02B 6/32 (2006.01)
G02B 6/35 (2006.01)
G02B 6/293 (2006.01)

(52) U.S. Cl.
CPC ........ *G02B 27/0955* (2013.01); *G02B 6/29311* (2013.01); *G02B 6/32* (2013.01); *G02B 6/356* (2013.01); *G02B 6/3512* (2013.01)

(58) Field of Classification Search
None
See application file for complete search history.

(56) References Cited

U.S. PATENT DOCUMENTS

| | | | | |
|---|---|---|---|---|
| 4,467,195 | A * | 8/1984 | Kawamura et al. | 250/216 |
| 6,278,553 | B1 * | 8/2001 | Akiyama | 359/627 |
| 6,498,872 | B2 * | 12/2002 | Bouevitch et al. | 385/24 |
| 2013/0148113 | A1 * | 6/2013 | Oku et al. | 356/237.2 |

FOREIGN PATENT DOCUMENTS

| | | |
|---|---|---|
| JP | S54-021751 | 2/1979 |
| JP | S57-210313 | 12/1982 |
| JP | 60-212710 | 10/1985 |
| JP | 2002-055276 | 2/2002 |
| JP | 2006-126738 | 5/2006 |
| JP | 2006-154628 | 6/2006 |

* cited by examiner

*Primary Examiner* — Uyen Chau N Le
*Assistant Examiner* — Hoang Tran
(74) *Attorney, Agent, or Firm* — Drinker Biddle & Reath LLP

(57) ABSTRACT

An optical device which reduces coupling loss while improving practicality is provided. A multi-core fiber coupling device is an optical device which couples a multi-core fiber to single core fibers, and includes a first optical system which is located on optical axes of a plurality of beams emitted from the multi-core fiber, and which makes the optical axes of the respective beams non-parallel to each other, thereby making the beams in a state of being separated from each other, and a second optical system S2 which makes the optical axes of the plurality of beams in a state of being non-parallel to each other on the side of the first optical system, in a state of being approximately parallel to each other.

20 Claims, 21 Drawing Sheets

Fig.3
(a)
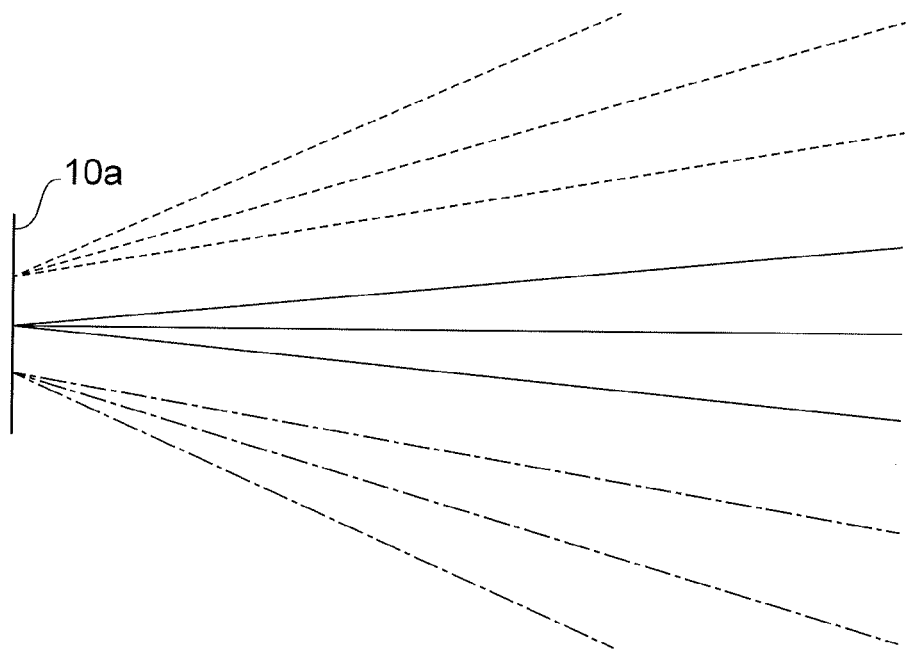
(b)
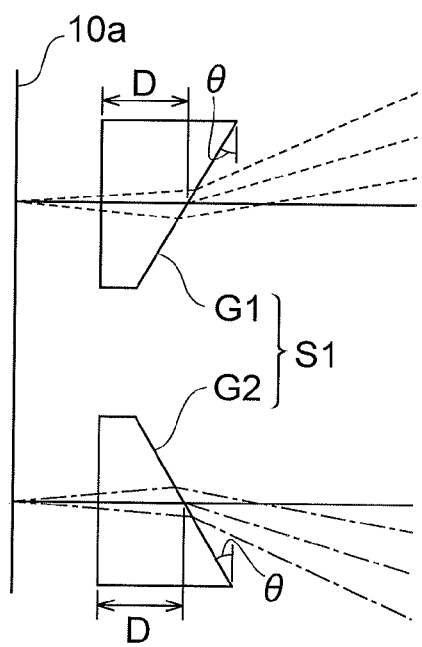

OPTICAL DEVICE

BACKGROUND OF THE INVENTION

1. Field of the Invention

The present invention relates to an optical device for coupling an optical component such as a plurality of single core fiber, to an optical element such as a multi-core fiber.

2. Related Background of the Invention

Conventionally, a multi-core fiber coupling device for coupling a plurality of single core fibers to a multi-core fiber is known. For example, Japanese unexamined Patent Publication No. 60-212710 discloses a device in which a lens is interposed between a multi-core fiber having two core regions and two single core fibers in order to branch the multi-core fiber. The lens in this device deflects a plurality of beams emitted from the multi-core fiber so as to be separated from each other in a direction inclined relative to an optical axis of the multi-core fiber.

According to the above-mentioned conventional art, since the lens inclines the beams from the multi-core fiber, in accordance with the inclination, the single core fibers need to be inclined. In this case, angular adjustment and alignment between the multi-core fiber and the single core fibers are so difficult, which is impractical.

Therefore, the Inventors have made a study on a device as shown in FIG. 1 as a more practical device. The device shown in FIG. 1 includes a lens L1 (focal length f1) that separates the plurality of beams from a multi-core fiber 10 from each other, and a lens L2 (focal length f2) that deflects the plurality of beams separated from each other by the lens L1 in a direction parallel to the optical axis of the multi-core fiber. For this reason, since there is no need to incline single core fibers 20 relative to the multi-core fiber 10, angular adjustment becomes unnecessary and high practicality can be achieved.

Here, the interval between the plurality of beams from the multi-core fiber 10 is extended by the lens L1, and an interval extending factor m is f2/f1. In contrast, in accordance with the Lagrange's Law used in the optical field, a beam spread angle $\theta$ is proportional to a reciprocal of the interval extending factor. That is, in the device shown in FIG. 1, given a beam spread angle $\theta_{OUT}$ on an end surface of the multi-core fiber, a spread angle (condensing angle) $\theta_{IN}$ on end surfaces of the single core fibers becomes $\theta_{OUT}/m$.

In the case where the beams emitted from the multi-core fiber are Gaussian beams, given that a beam radius on the end surface of the multi-core fiber is $w_{OUT}$ and wavelength is $\lambda$, the spread angle $\theta_{OUT}$ satisfies a following equation.

$$\theta = \lambda/(\pi/w)$$

Meanwhile, $\pi$ is a circular constant. The above-mentioned equation is also applied to beams incident on the single core fibers. The spread angle $\theta_{IN}$ of the beams incident on the single core fibers becomes $\theta_{IN}/m$ according to the Lagrange's Law. In this case, a beam radius $w_{IN}$ on the end surfaces of the single core fibers is multiplied by m according to the above-mentioned equation to become $m/w_{OUT}$. Consequently, there has been a problem in which optical coupling loss to the single core fibers becomes large.

The present invention has been made to solve the above-mentioned problem, and its object is to provide an optical device that reduces coupling loss while improving practicality.

SUMMARY OF THE INVENTION

An optical device from one aspect of the present invention is an optical device which couples an optical element including a plurality of light input/output parts having respective optical axes parallel to each other, to another optical component, the optical device including: a first optical system which is located on optical axes of a plurality of beams incident on and emitted from the plurality of light input/output parts of the optical element, and which makes the respective optical axes of the beams non-parallel to each other, thereby making the beams in a state of being separated from each other, and a second optical system which makes the optical axes of the plurality of beams left in a state of being non-parallel to each other on the side of the first optical system, in a state of being approximately parallel to each other.

In the optical device, the plurality of beams separated from each other by the first optical system is made approximately parallel to each other by the second optical system. For this reason, since the other optical component need not be inclined relative to the optical element and angular adjustment is not required, high practicality can be achieved. Moreover, coupling loss can be reduced.

The second optical system may have a mode of focusing a plurality of beams on the other optical component.

The optical element may be a multi-core fiber, the other optical component may be a plurality of single core fibers, and a focal length of the first optical system may be equal to a focal length of the second optical system. This reduces coupling loss of light to the single core fibers.

An optical device according to one aspect of the present invention is an optical device that couples an optical element including a plurality of light input/output parts having respective optical axes that are parallel to each other, to the other optical component via a wavelength dispersive element. The optical device includes a first optical system which is located on optical axes of a plurality of beams incident on and emitted from the plurality of light input/output parts of the optical element, and which makes the respective optical axes of the beams non-parallel to each other, thereby making the beams in a state of being separated from each other on the side of the wavelength dispersive element, and a second optical system which is located between the first optical system and the wavelength dispersive element, and which makes the optical axes of the plurality of beams left in a state of being non-parallel to each other on the side of the first optical system, in a state of being approximately parallel to each other on the side of the wavelength dispersive element. In the optical device, the beams passing through the second optical system are introduced into the wavelength dispersive element, and/or the beams from the wavelength dispersive element are made incident on the second optical system.

In this optical device, the optical paths of the beams are left in a state of being separated from each other by the first optical system on the side of the wavelength dispersive element of the optical system, and the optical axes of the beams are left in a state of being approximately non-parallel to each other by the second optical system on the side of the wavelength dispersive element of the optical system. Then, the beams that are made approximately parallel to the optical axes are introduced into the wavelength dispersive element, and the beams from the wavelength dispersive element are made incident on the second optical system. In this case, since the optical axes of the beams are approximately parallel to each other on the side of the wavelength dispersive element of the second optical system, wavelength multiplexing and demultiplexing can be easily performed by a simple method of arranging the single wavelength dispersive element on the optical paths. Furthermore, in the case where the optical paths of the beams on the side of the wavelength dispersive element of the second optical system are made approximately parallel to the optical axis of the multi-core fiber, the other components such as the single core fiber need not be inclined relative to the optical element such as the multi-core fiber, and thus ease of alignment and positioning is enhanced, which is advantageous for reduction in the size of the entire optical device.

In the above-mentioned optical device, a plurality of beams pass through the second optical system, and at least two beams among the plurality of beams may have a mode of being introduced into the wavelength dispersive element.

In the above-mentioned optical device, the second optical system may have a mode of spatially separating the plurality of beams left in a state of being separated from each other by the first optical system from each other, and making the separated beams incident on the wavelength dispersive element.

In the above-mentioned optical device, an alignment direction of the optical axes of the plurality of beams incident on or emitted from the plurality of light input/output parts of the optical element may be different from a light dispersion direction in which beams are dispersed by the wavelength dispersive element. In this case, even when the wavelengths of the beams are dispersed by the wavelength dispersive element, the occurrence of crosstalk or the like between the dispersed beams can be prevented.

As described above, in order to make the alignment direction different from the light dispersion direction, first optical system may be coupled to the optical element such as the plurality of light input/output parts of the optical element are arranged non-parallel to the light dispersion direction of the wavelength dispersive element. Furthermore, the optical device may further includes a mirror that bends spatial coordinates of the plurality of beams incident on or emitted from the wavelength dispersive element such that an alignment direction of the optical axes of the plurality of beams incident on or emitted from the plurality of light input/output parts of the optical element is different from a light dispersion direction in which beams are dispersed by the wavelength dispersive element, and the mirror may be arranged on the optical paths of the plurality of beams.

In the above-mentioned optical device, an interval between the optical axes of the plurality of light input/output parts of the optical element may be 100 μm or less, and the optical element may be a multi-core fiber having an interval between the optical axes of the plurality of light input/output parts of 50 μm or less. Moreover, the first optical system may be a monocular lens, and the second optical system may be an ommateal lens formed of a plurality of optical elements. In addition, the second optical system may include a lens that collimates the plurality of beams separated from each other by the first optical system, and each of the plurality of beams incident on the wavelength dispersive element each may be an approximately collimated beam.

In the above-mentioned optical device, an aberration of the second optical system may be able to corrected. In this case, for example, a part of the second optical system may be different from the other parts in position relative to the other optical component, and aberration of the second optical system may be corrected. In addition, the first and second optical systems may be integrally formed as one optical component. Furthermore, at least one of the first and second optical systems may be a GRIN lens.

Any of the above-mentioned optical devices may be applied to an optical multiplexer and an optical demultiplexer, or to a wavelength selective switch and a wavelength blocker. Furthermore, with the wavelength selective switch, in the wavelength selective switch including any of the above-mentioned optical devices, the plurality of light input/output parts includes at least one input port and output port, the other optical component may be a spatial modulating element that deflects and combines predetermined wavelength component signal light toward a predetermined output port. With the wavelength blocker, in the wavelength blocker including any of the above-mentioned optical devices, the plurality of light input/output parts, at least one input port and/or output port, and the other optical component may be a shielding element that shields predetermined wavelength component signal light.

According to the present invention, coupling loss can be reduced while being practicality improved.

BRIEF DESCRIPTION OF THE DRAWINGS

FIGS. 3A and 3B are views showing a mode of enlarging a beam interval on an end surface of a multi-core fiber.

DESCRIPTION OF THE PREFERRED EMBODIMENTS

Figure 1:
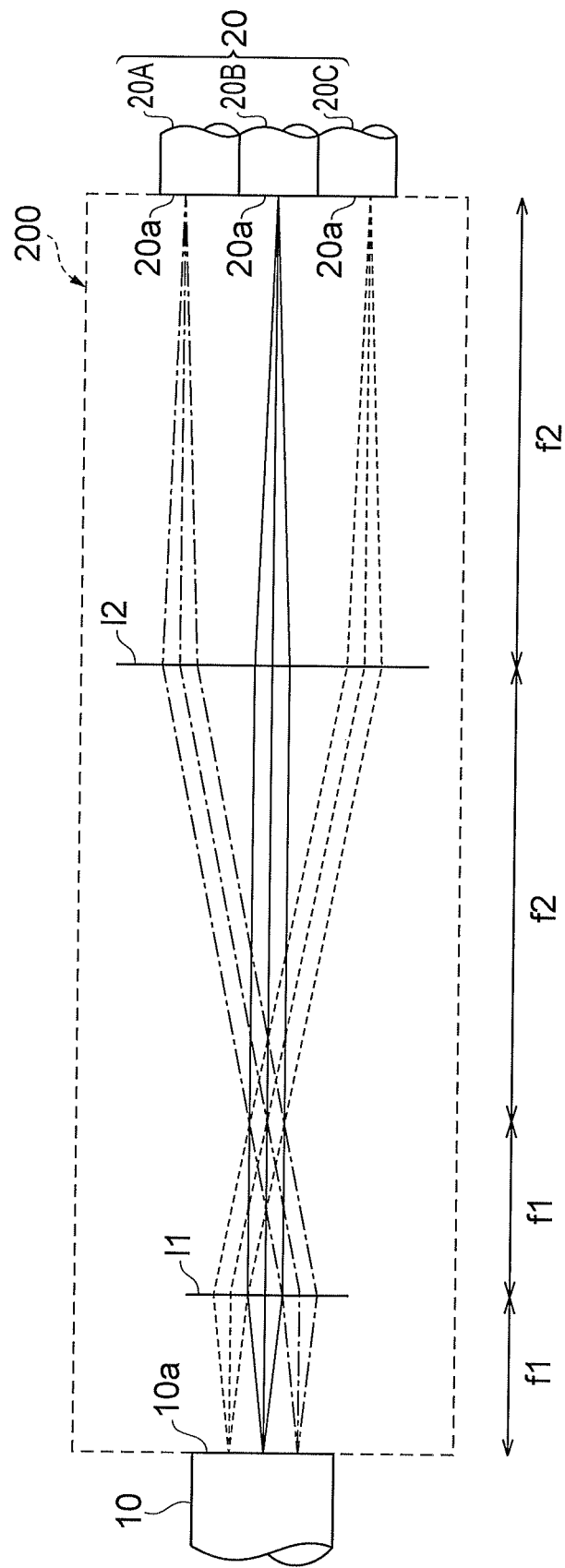
FIG. 1 is a schematic configuration diagram showing a multi-core fiber coupling device according to a conventional art.

Preferred embodiments of the present invention will be described below in detail with reference to the accompanying drawings. Meanwhile, in following description, the same reference numerals are given to the same elements or elements having the same function and overlapping description thereof is omitted.

[First Embodiment] First, an optical device 100 according to the first embodiment will be described with reference to FIG. 2.

Figure 2:
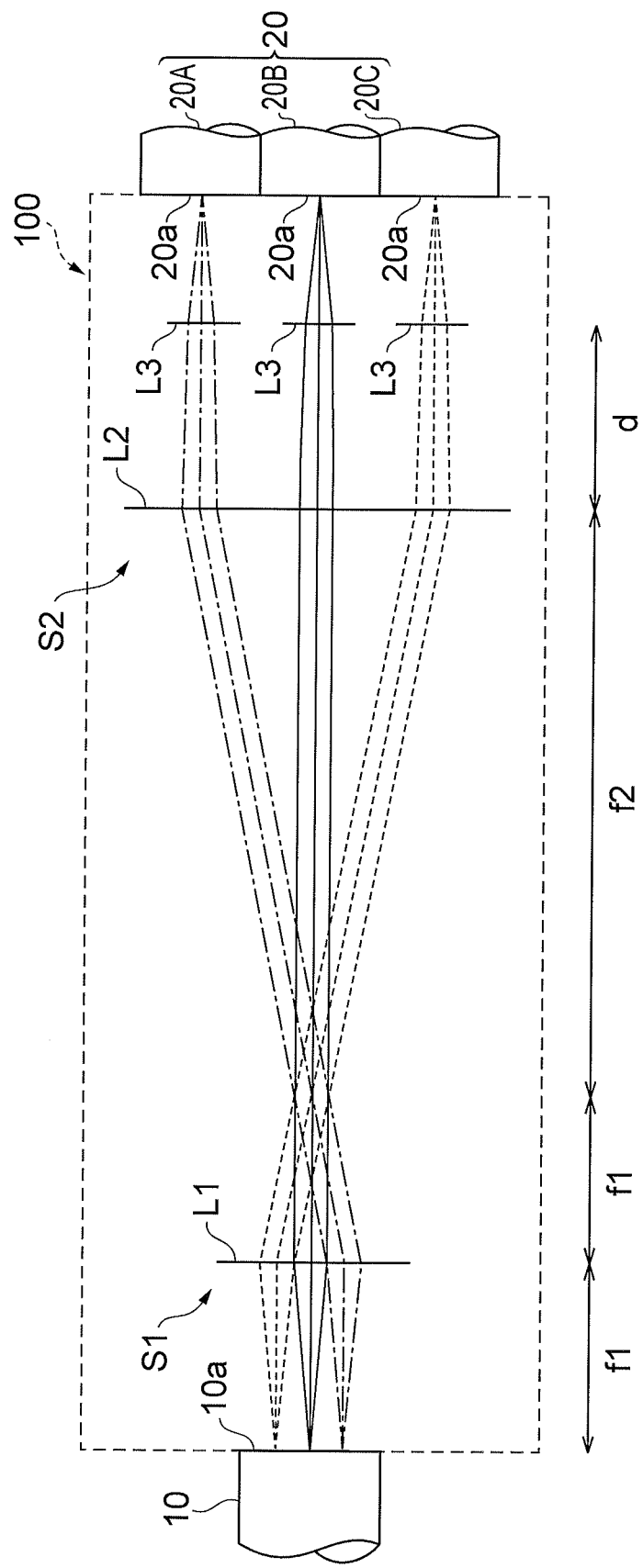
FIG. 2 is a schematic configuration diagram showing a multi-core fiber coupling device according to a first embodiment.

As shown in FIG. 2, the optical device 100 is a device for coupling the multi-core fiber 10 (optical element) to the single core fibers 20 (other optical components) in order to propagate a single-mode light signal (wavelength multiplexed signal), and is configured by including a first optical system S1 and a second optical system S2. Hereinafter, the optical device using the multi-core fiber as an optical element and being included in the present invention is referred to as multi-core fiber coupling device.

The multi-core fiber 10 used in this embodiment is an optical element including a plurality of light output parts having respective optical axes that are parallel to one another, and specifically, has seven core regions, and emits seven beams (only three beams are shown in a sectional view of FIG. 2) from an emitting end surface 10a. More specifically, the seven core regions are located at apexes and the center of a regular hexagon on the end surface 10a, and an interval between the adjacent core regions (that is, an interval between the beams on the emitting end surface 10a) is constant, for example, about 0.045 mm. Meanwhile, a cladding diameter of the multi-core fiber 10 is about 0.15 mmφ.

In contrast, the same number of (that is, seven) single core fibers 20 as the number of the core regions of the multi-core fiber 10 are prepared, and light-receiving end surfaces 20a are arranged on the same plane in parallel with the emitting end surface 10a of the multi-core fiber 10. That is, the seven single core fibers 20 (only three single core fibers 20A, 20B, and 20C are shown in the sectional view of FIG. 2) are not inclined with respect to the multi-core fiber 10 at least at their ends, and are arranged parallel to an extending direction of the multi-core fiber 10, resulting in the fact that an optical axis of the multi-core fiber 10 is parallel to an optical axes of each of the single core fibers 20. For extending tolerance at the time of mounting, the single core fibers 20 can be appropriately changed to TEC fibers (Thermally-diffused Expanded Core Fiber) each having a locally expanded mode field diameter (MFD) at its end.

The first optical system S1 is located on the optical axes of the plurality of beams incident on/emitted from a plurality of light input/output parts of the multi-core fiber 10, and makes the optical axes of the beams non-parallel to one another, thereby making the beams in a state of being separated from one another. The first optical system S1 is located on the side of the multi-core fiber 10 and is constituted by one condensing lens L1. The condensing lens L1 is arranged so as to face the end surface 10a of the multi-core fiber 10 on an axial line of an emitting end of the multi-core fiber 10. As shown in FIG. 2, the condensing lens L1 is arranged away from the end surface 10a of the multi-core fiber 10 by the focal length f1 of the condensing lens L1. Then, after the intervals between the plurality of beams passing through the condensing lens L1 are once reduced, then, the plurality of beams is separated from one another, and an interval between the beams is extended as the beams are away from the first optical system S1.

The second optical system S2 changes the state where the optical axes of the plurality of beams, which are nonparallel to one another on the side of the first optical system S1, to the state where they are approximately parallel to one another. The second optical system S2 is located on the side of the single core fibers 20, and is constituted by one condensing lens L2 and seven condensing lenses L3. Although the condensing lenses L3 are shown so as to be spatially separated from one another in FIG. 2, the lenses may be integrally configured as a lens array.

Like the condensing lens L1, the condensing lens L2 is arranged so as to face the end surface 10a of the multi-core fiber 10 on the axial line of the emitting end of the multi-core fiber 10. As shown in FIG. 2, the condensing lens L2 is arranged away from the condensing lens L1 by a distance as a sum of the focal length f1 of the condensing lens L1 and the focal length f2 of the condensing lens L2 (f1+f2). Then, the plurality of beams passing through the condensing lens L2, which are separated from one another by the condensing lens L1, are deflected in a direction parallel to the optical axis of the multi-core fiber 10 (that is, an axial direction orthogonal to the end surface 10a of the multi-core fiber 10, a direction in which the end surface 10a of the multi-core fiber 10 faces the end surfaces 20a of the single core fibers 20).

The seven condensing lenses L3 is arranged so as to face the condensing lens L2 on the optical axes of the deflected beams such that each of the plurality of deflected beams is condensed. As shown in FIG. 2, the condensing lenses L3 each are separated from the condensing lens L2 by a predetermined distance d. This distance d is determined depending on a focal length f3 of the condensing lenses L3. That is, the distance d and the focal length f3 are set such that the focal length f1 of the condensing lens L1 becomes equal to a combined focal length f of the condensing lens L2 and the condensing lenses L3.

The combined focal length f of the condensing lens L2 and the condensing lenses L3 is obtained according to a following equation.

$$1/f = 1/f2 + 1/f3 - d/(f2 \cdot f3)$$

Then, by making the focal length f1 of the condensing lens L1 equal to the combined focal length f of the condensing lens L2 and the condensing lenses L3, the spread angle (condensing angle) $\theta_{IN}$ at incidence of the beams passing through the condensing lenses L3 on the single core fibers 20 becomes equal to the beam spread angle $\theta_{OUT}$ at the time of emitting of the beams from the multi-core fiber 10. As a result, in coupling the multi-core fiber 10 to the single core fibers 20, a very low coupling loss (for example, 0.5 dB) can be achieved.

As described above, in the multi-core fiber coupling device 100, the plurality of beams from the multi-core fiber 10, which are separated from one another by the condensing lens L1 of the first optical system S1, are deflected in the direction parallel to the optical axis of the multi-core fiber 10 by the condensing lens L2, L3 of the second optical system S2 (axial direction orthogonal to the end surface 10a). Therefore, since there is no need to incline the single core fibers 20 relative to the multi-core fiber 10, requiring no angular adjustment, high practicality is achieved.

In addition, with the configuration in this embodiment in which the multi-core fiber 10 as the optical element and the plurality of single core fibers 20 as the other optical components are adopted, the combined focal length f of the condensing lens L2 and L3 of the second optical system S2 that condenses the plurality of beams from the multi-core fiber 10, which are separated from one another by the condensing lens L1 of the first optical system S1, on the respective core regions of the single core fibers 20 corresponding to the beams is equal to the focal length f1 of the lens L1 of the first optical system S1. For this reason, coupling loss of light to the single core fibers 20 is reduced.

Although the plurality of beams from the multi-core fiber 10 are separated from one another by the lens L1 of the first optical system S1 in the above-mentioned embodiment, the plurality of beams can be separated from one another also in a mode as shown in FIGS. 3A and 3B. In FIG. 3A, by subjecting the end surface 10a to a end surface treatment not shown, beams are adjusted in the beam-emitting directions in which beams are separated from one another. More specifically, by curving or chamfering the end surface 10a, the end surfaces of the core regions surrounding the end surface of the central core region are inclined relative to the end surface of the central core region to adjust the beam-emitting directions. At this time, when an inclination angle of the end surface of each core region is set to be an angle that is twice as large as the beam spread angle or more, the adjacent beams do not cross each other.

Alternatively, as shown in FIG. 3B, six glass blocks (two glass blocks G1, G2 are shown in a sectional view of FIG. 3B) are arranged in association with the surrounding core regions, and the glass blocks can refract beams from the surrounding core regions, thereby making the plurality of beams separated from the multi-core fiber 10 from one another. When it is assumed that the beam interval is 0.045 mm and the numerical aperture (NA) is 0.1, the glass blocks G1, G2 can be set to have an inclination angle θ of 30 degrees and a length D of the glass block of 10 μm.

[Second Embodiment] Subsequently, a multi-core fiber coupling device 100A according to the second embodiment will be described with reference to FIG. 4.

Figure 4:
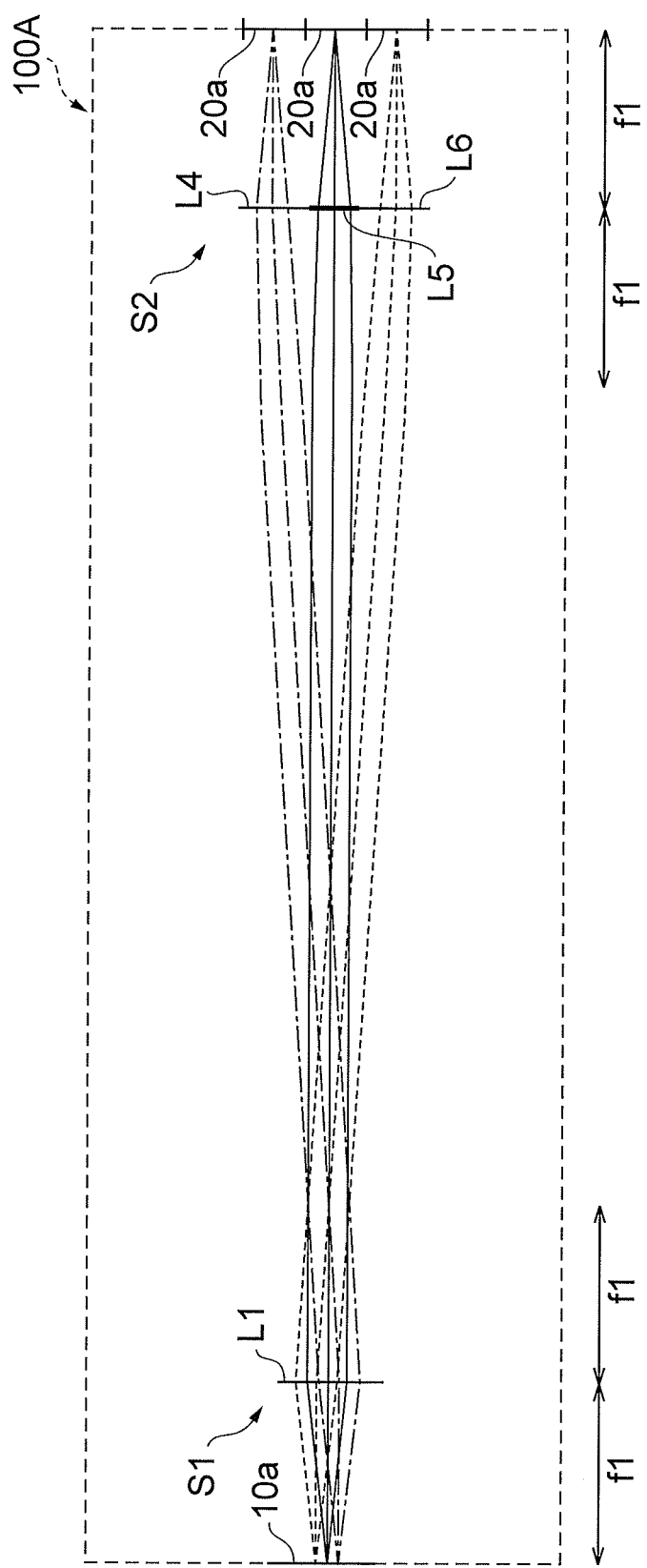
FIG. 4 is a schematic configuration diagram showing a multi-core fiber coupling device according to a second embodiment.

As shown in FIG. 4, the multi-core fiber coupling device 100A is different from the multi-core fiber coupling device 100 according to the first embodiment only in a configuration of the second optical system S2.

The second optical system S2 of the multi-core fiber coupling device 100A are constituted by a lens array L4 to L6. The lens array is constituted by seven lenses (only the three lenses L4 to L6 are shown in a sectional view of FIG. 4) so as to correspond to the respective seven beams. A focal length of each of the seven lenses L4 to L6 of the second optical system S2 is f1, which is equal to the focal length of the condensing lens L1 of the first optical system S1.

For this reason, the spread angle $\theta_{OUT}$ on the end surface 10a of the multi-core fiber 10 becomes equal to the spread angle $\theta_{IN}$ on the end surfaces of the single core fibers 20 as in the first embodiment, and thus in coupling the multi-core fiber 10 to the single core fibers 20, very low coupling loss can be achieved.

Figure 5:
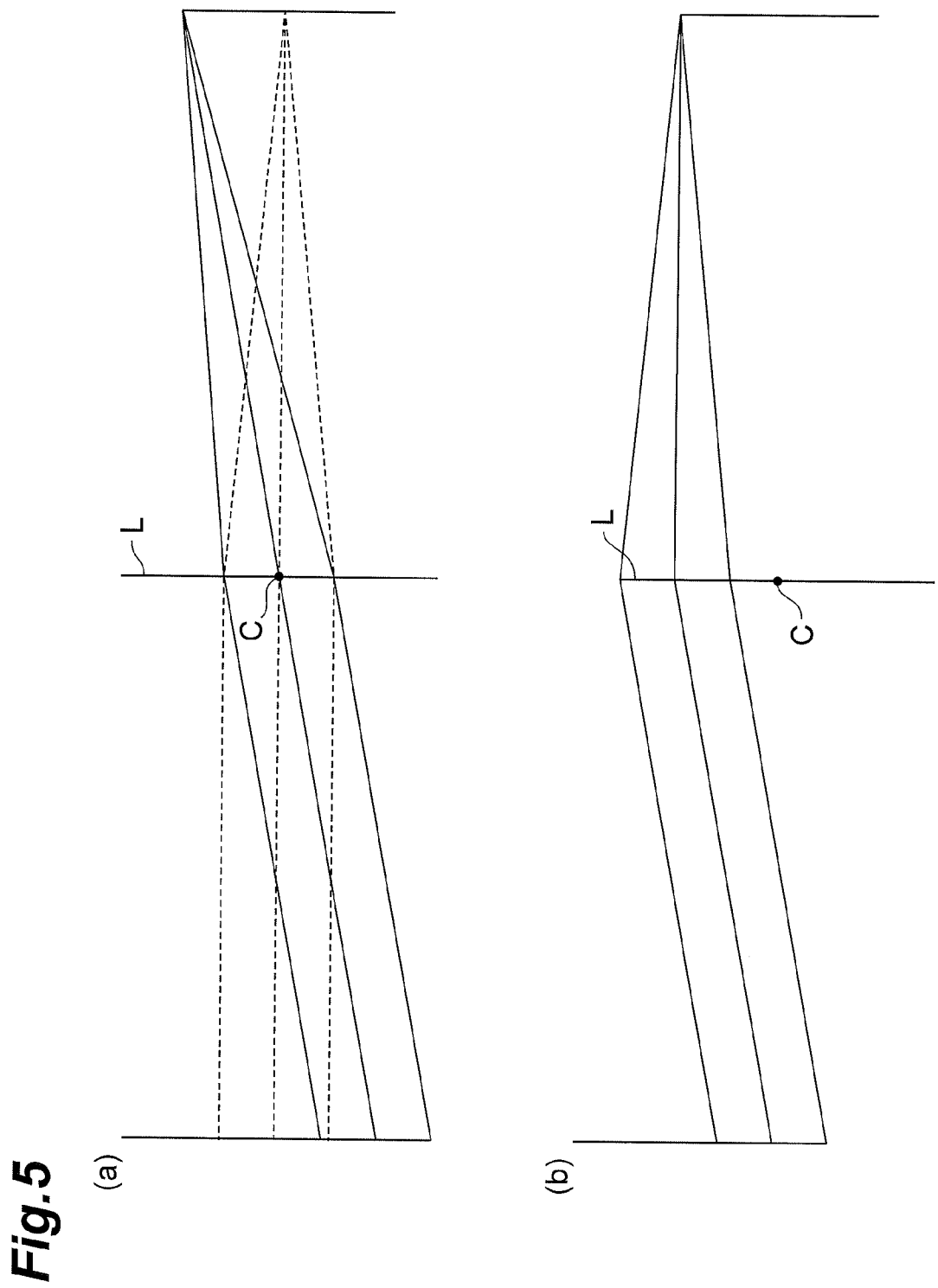
FIGS. 5A and 5B are views showing displacement of a lens of a second optical system in the multi-core fiber coupling device shown in FIG. 4.

It should be noted that also in the second embodiment, like the condensing lens L2 in the first embodiment, a lens deflects beams. More specifically, in the second embodiment, as shown in FIGS. 5A and 5B, the beams are deflected by displacing the lens L. That is, as shown in FIG. 5A, when a center line of the beam (middle line in FIGS. 5A and 5B) passes a central point C of the lens L, the beam is not deflected. However, as shown in FIG. 5B, by displacing the center line of the beam from the central point C of the lens L, like the beam passing through the condensing lens L2 is deflected in the direction parallel to the optical axis of the multi-core fiber 10. The lens L is displaced in a direction in which the central point C gets close to a main light beam of the central beam (that is, in a direction in which the central point C gets close to the central lens L5). When the lenses contact each other and thus, the lenses cannot be displaced, a lens piece obtained by cutting a part of the lens may be used.

Therefore, the multi-core fiber coupling device 100A according to the second embodiment can obtain the same or similar effect as the multi-core fiber coupling device 100 according to First embodiment described above.

[Third Embodiment] Next, a multi-core fiber coupling device 100B according to the third embodiment will be described with reference to FIG. 6 to FIG. 8.

Figure 6:
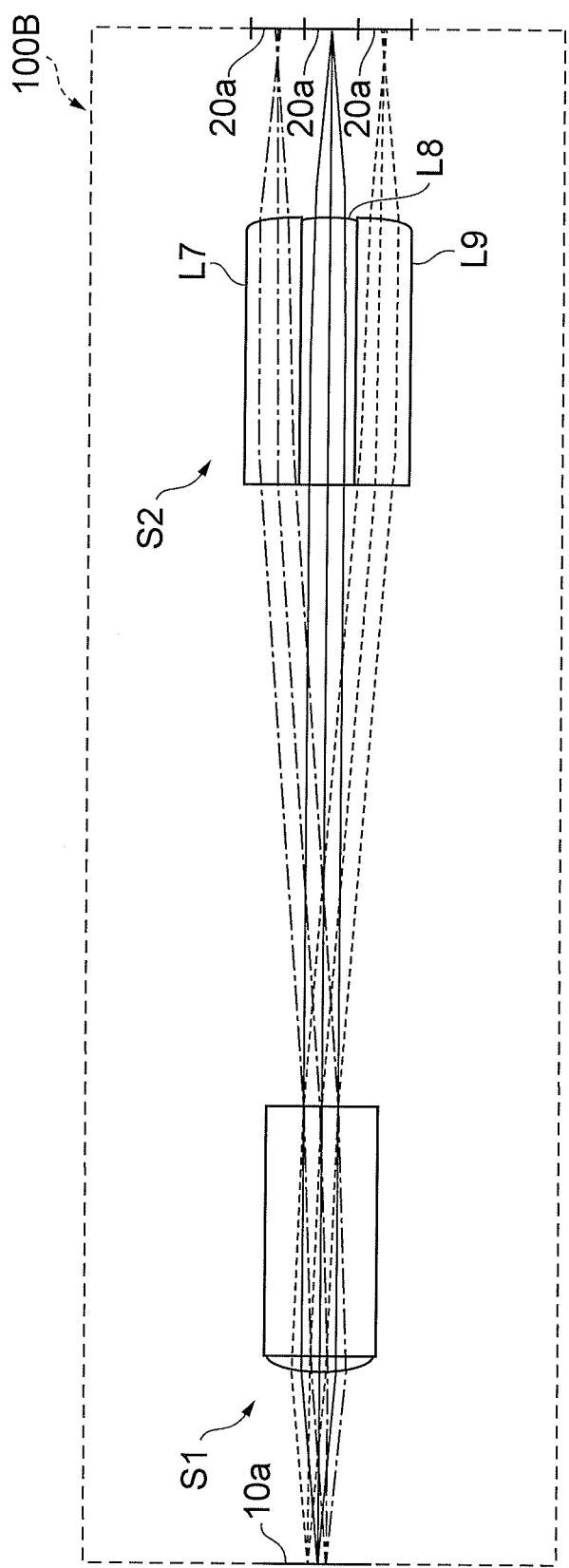
FIG. 6 is a schematic configuration diagram showing a multi-core fiber coupling device according to a third embodiment.

As shown in FIG. 6, the multi-core fiber coupling device 100B is different from the multi-core fiber coupling device 100A according to the second embodiment described above only in a configuration of the second optical system S2. That is, the second optical system S2 of the multi-core fiber coupling device 100B is constituted by one lens array in which seven lens pieces L7 to L9 are combined in place of the seven lenses L4 to L6.

Such multi-core fiber coupling device 100B also can obtain the same or similar effect as the multi-core fiber coupling device 100 according to the first embodiment.

Here, in the case of more practical lens, not an ideal lens, an aberration of the lens is required to be considered.

Figure 7:
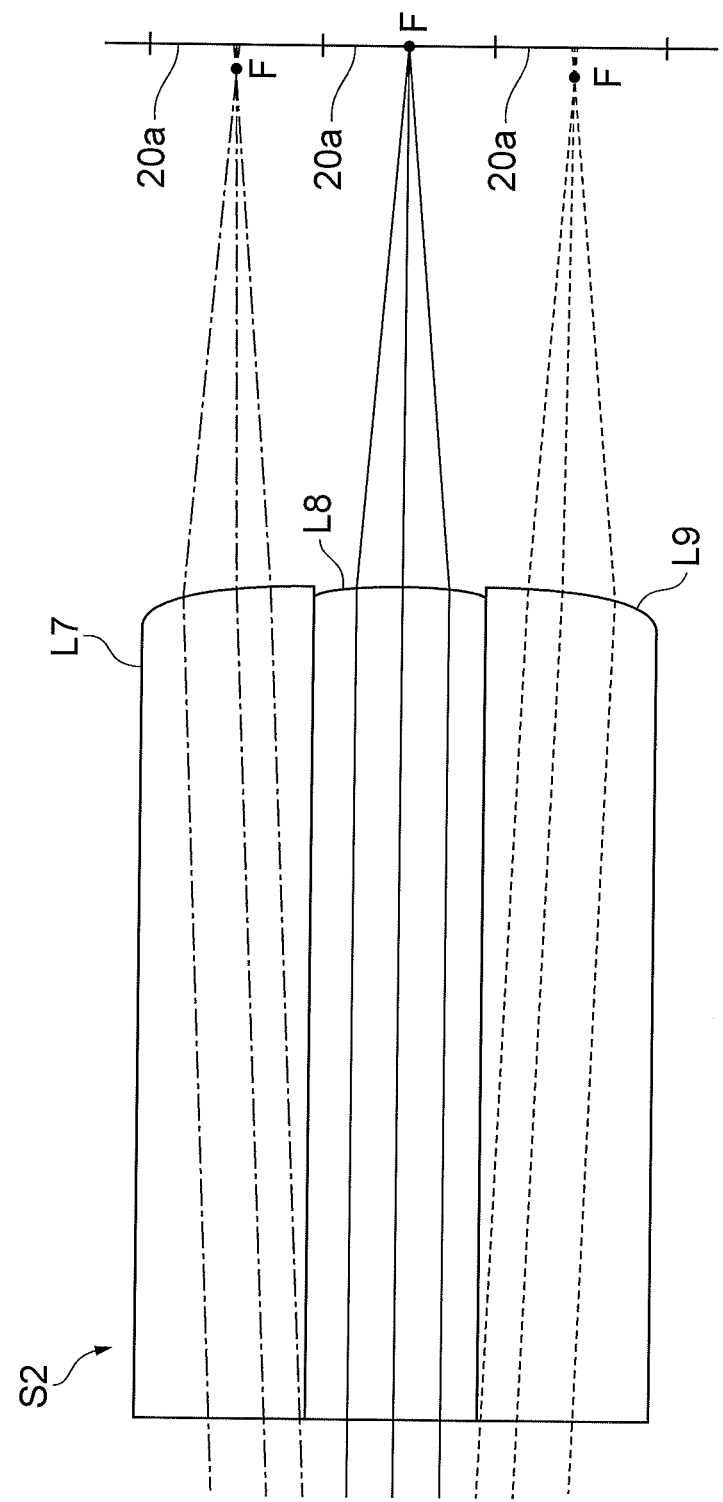
FIG. 7 is a partial enlarged sectional view of a second optical system in the multi-core fiber coupling device shown in FIG. 6.

As shown in FIG. 7, a plurality of beams passing through the lens array L7 to L9 of the second optical system S2 does not form a focal point F on the same plane (that is, the end surfaces 20a of the single core fibers 20). Specifically, in the case where the lens array L7 to L9 is arranged such that the beam passing through the central lens piece L8 form the focal point on the end surface 20a of the single core fiber 20, the surrounding lens pieces L7 and L9 each form the focal point F in front of the end surface 20a of the single core fiber 20.

Figure 8:
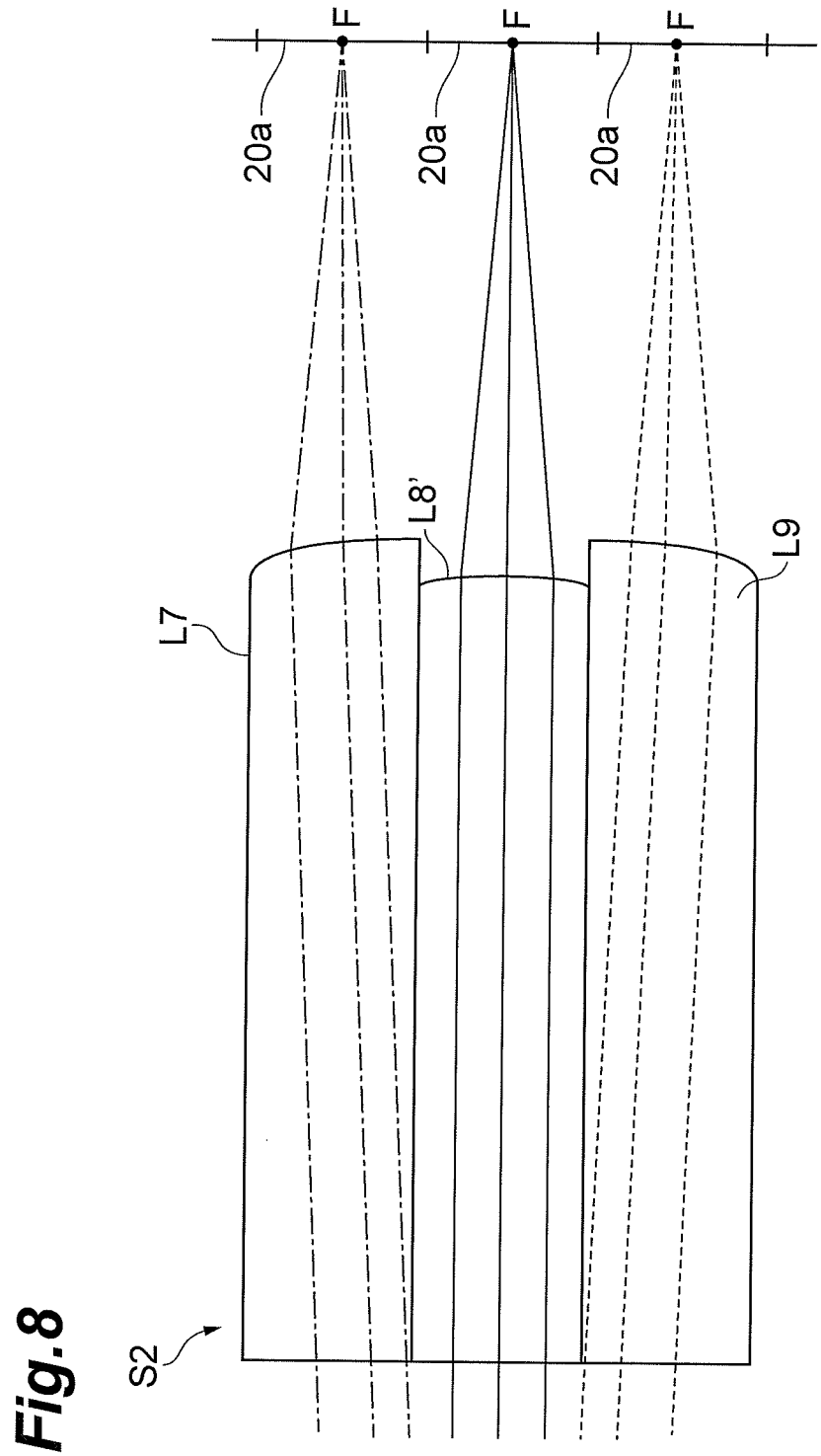
FIG. 8 is a view showing another mode of the second optical system shown in FIG. 7.

In such case, in order to correct the aberration, it is preferred to have a lens configuration shown in FIG. 8.

That is, a central lens piece L8' and the surrounding lens pieces L7 and L9 are relatively displaced in the direction of the optical axis of the multi-core fiber 10. Thereby, all of the beams passing through the lens array L7, L8' and L9 of the second optical system S2 make the focus F on the same plane. It should be noted that the aberration may be corrected by changing, to another part, a relative position of a part of the lens array formed of the lenses L7 to L9 with respect to the single core fiber 20 in the second optical system S2 as described above, or by changing a planar shape of the integrated lens. Alternatively, the aberration may be corrected by varying the refractive index of the integrated lens at the central area and at side areas lateral to the central area.

[Fourth Embodiment] Next, a multi-core fiber coupling device 100C according to the fourth embodiment will be described with reference to FIG. 9.

Figure 9:
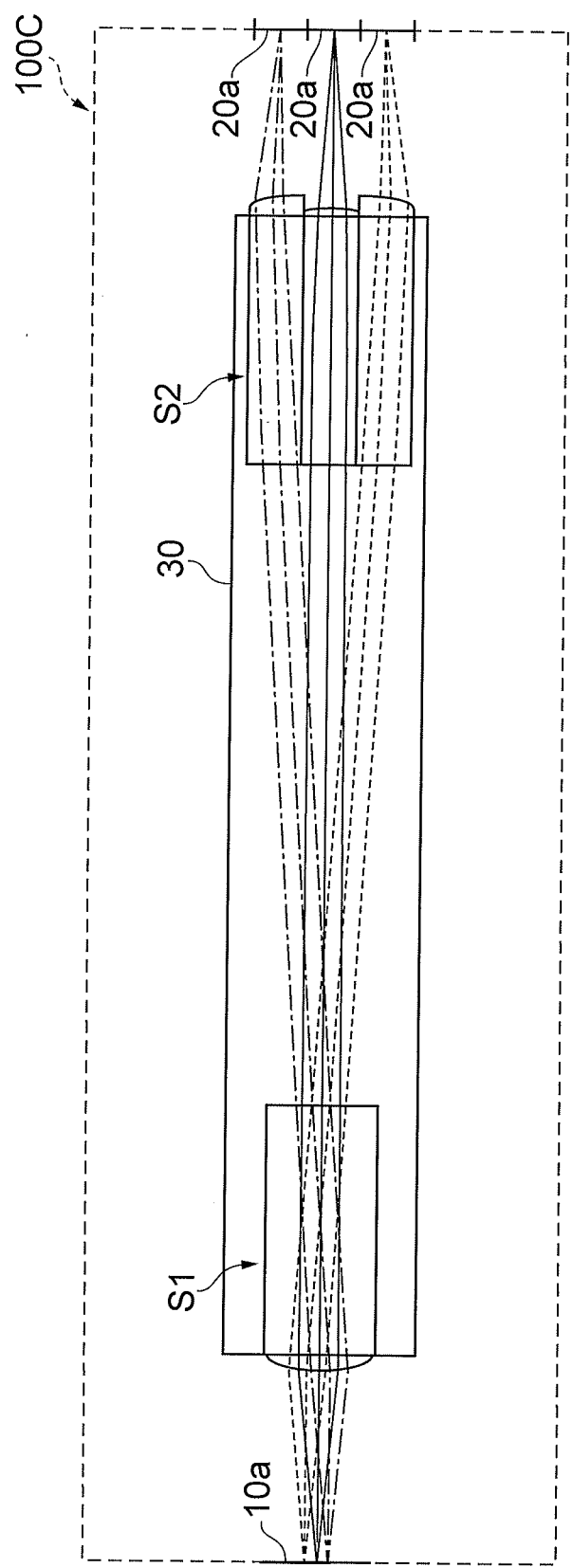
FIG. 9 is a schematic configuration diagram showing a multi-core fiber coupling device according to a fourth embodiment.

As shown in FIG. 9, the multi-core fiber coupling device 100C is different from the multi-core fiber coupling device 100B according to the third embodiment in that it includes an integration member 30. The integration member 30 is a member for integrally configuring the first optical system S1 and the second optical system S2 as one optical component and for keeping a relative position between the first optical system S1 and the second optical system S2 constant. The integration member 30 may be a hollow case in which air is interposed between the first optical system S1 and the second optical system S2, or may be a solid member in which a translucent material is interposed between the first optical system S1 and the second optical system S2. In the case of the solid member, the first optical system S1, the integration member 30 and the second optical system S2 may be integrally molded.

Figure 10:
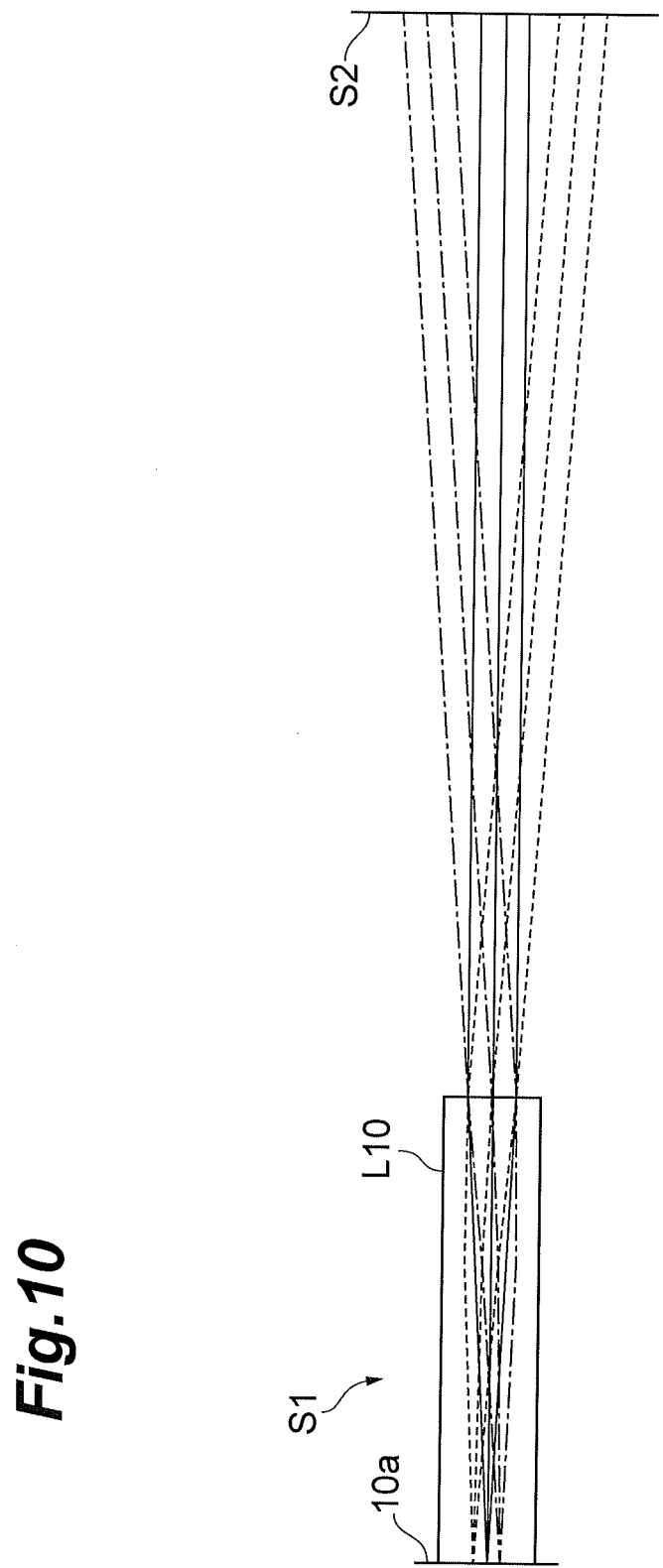
FIG. 10 is an enlarged view of a first optical system according to a fifth embodiment.

[Fifth Embodiment] The first optical system S1 in the first to the fourth embodiments as described above, may be appropriately replaced with a GRIN lens (Graded Refractive Index lens) L10 as shown in FIG. 10.

Figure 11:
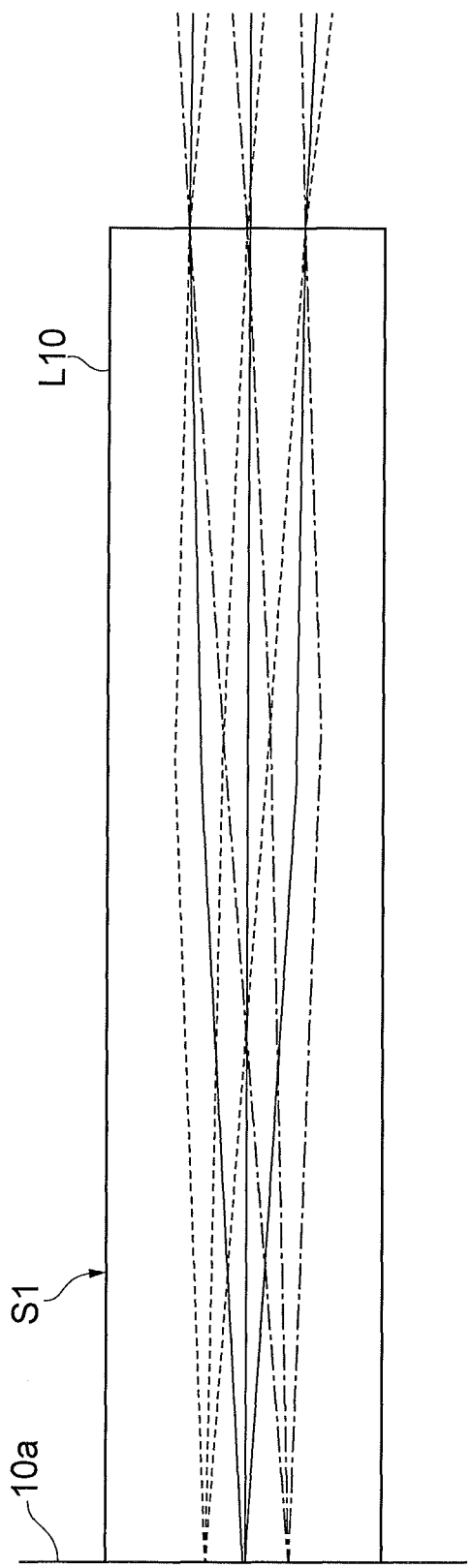
FIG. 11 is a partial enlarged view of the first optical system shown in FIG. 10.

As can be seen from optical path views of FIG. 10 and FIG. 11, as in the first optical system S1 in the first to the fourth embodiments, the plurality of beams from the multi-core fiber 10 are separated from one another by the GRIN lens L10.

In the case of using the GRIN lens L10 as the first optical system S1 as described above, since the beams do not propagate in air, reflection loss in an interface between glass and air is significantly reduced. Furthermore, by previously polishing the end surface 10a of the multi-core fiber 10 and an end surface of the GRIN lens L10 to be vertical relative to the optical axis, there is an advantage that angular adjustment of the multi-core fiber 10 and the GRIN lens L10 is not required and only displacement of the optical axis needs to be adjusted.

It should be noted that the GRIN lens can also be applied to the second optical system S2 as well as the first optical system S1.

Figure 12:
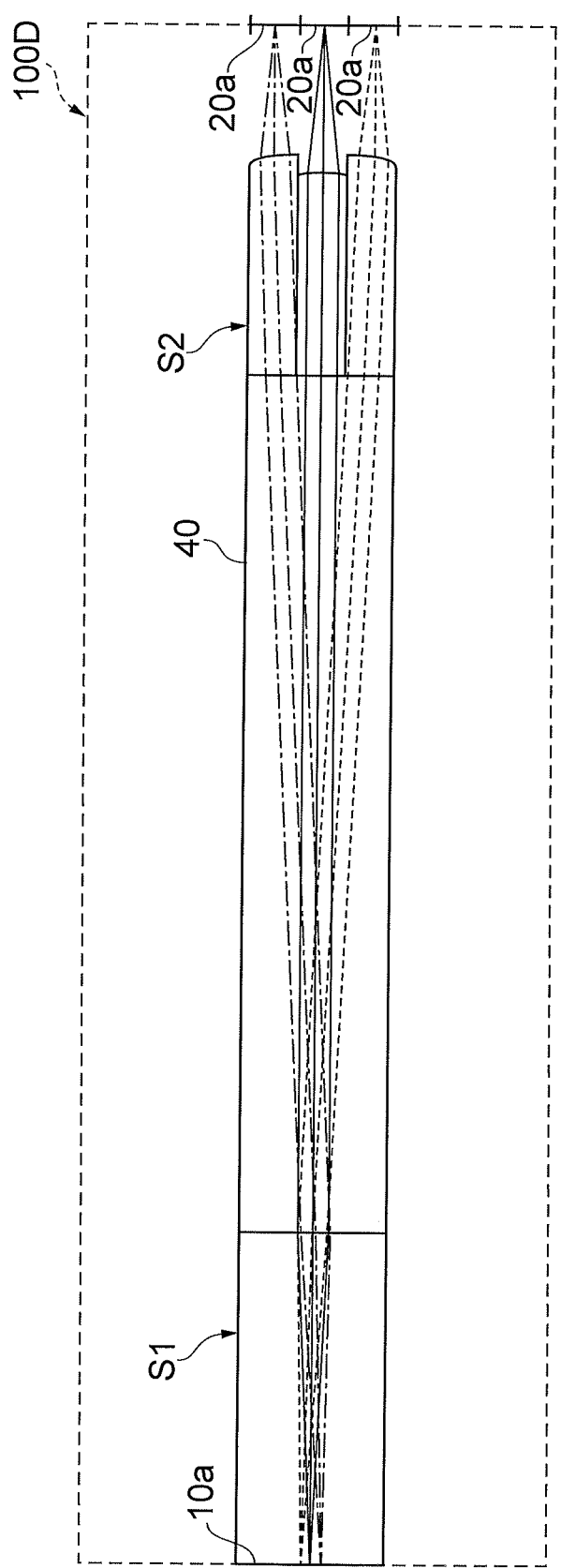
FIG. 12 is a schematic configuration diagram showing a multi-core fiber coupling device according to a sixth embodiment.

[Sixth Embodiment] As in a multi-core fiber coupling device 100D according to the sixth embodiment in FIG. 12, a glass block 40 may be arranged so as not to interpose air between the first optical system S1 and the second optical system S2.

In this way, in the case of using the glass block 40 interposed between the first optical system S1 and the second optical system S2 as described above, since the beams do not propagate in air, reflection loss in the interface between glass and air is significantly reduced.

By using the multi-core fiber coupling device 100D according to the sixth embodiment among the multi-core fiber coupling devices according to the above-mentioned embodiments as an example, specific size of each component will be described. There will be described a mode in which a plurality of beams are emitted from the end surface 10a of the multi-core fiber 10, at an beam interval of 0.045 mm, and are incident on the end surfaces 20a of the single core fibers 20, at an beam interval of 0.25 mm.

Lengths of the first optical system S1(GRIN lens), the glass block 40 and the second optical system S2 are 1.5 mm, 3.9 mm and 1 mm, respectively, and the entire length is about 6.4 mm.

The beams emitted from the end surface 10a of the multi-core fiber 10 (beams incident on the coupling device) each have a beam interval of 0.045 mm and NA of 0.1.

The GRIN lens of the first optical system S1 has n(r) of $1.5-0.8 \times r2$, L of 1.5 mm and a diameter of 0.66 mm.

The glass block 40 is made of SiO2 and has L of 3.9 mm and a diameter of 0.66 mm.

The lens of the second optical system S2 is made of SiO2 or similar materials, and has a focal length of 0.7 mm, a curvature radius of 0.312 mm and L of 1 mm.

The beams incident on the end surfaces 20a of the single core fibers 20 (beams emitted from the coupling device) has a beam interval of 0.25 mm and NA of 0.1.

[Seventh Embodiment] Next, an optical device 300 according to the seventh embodiment will be described with reference to FIG. 13.

Figure 13:
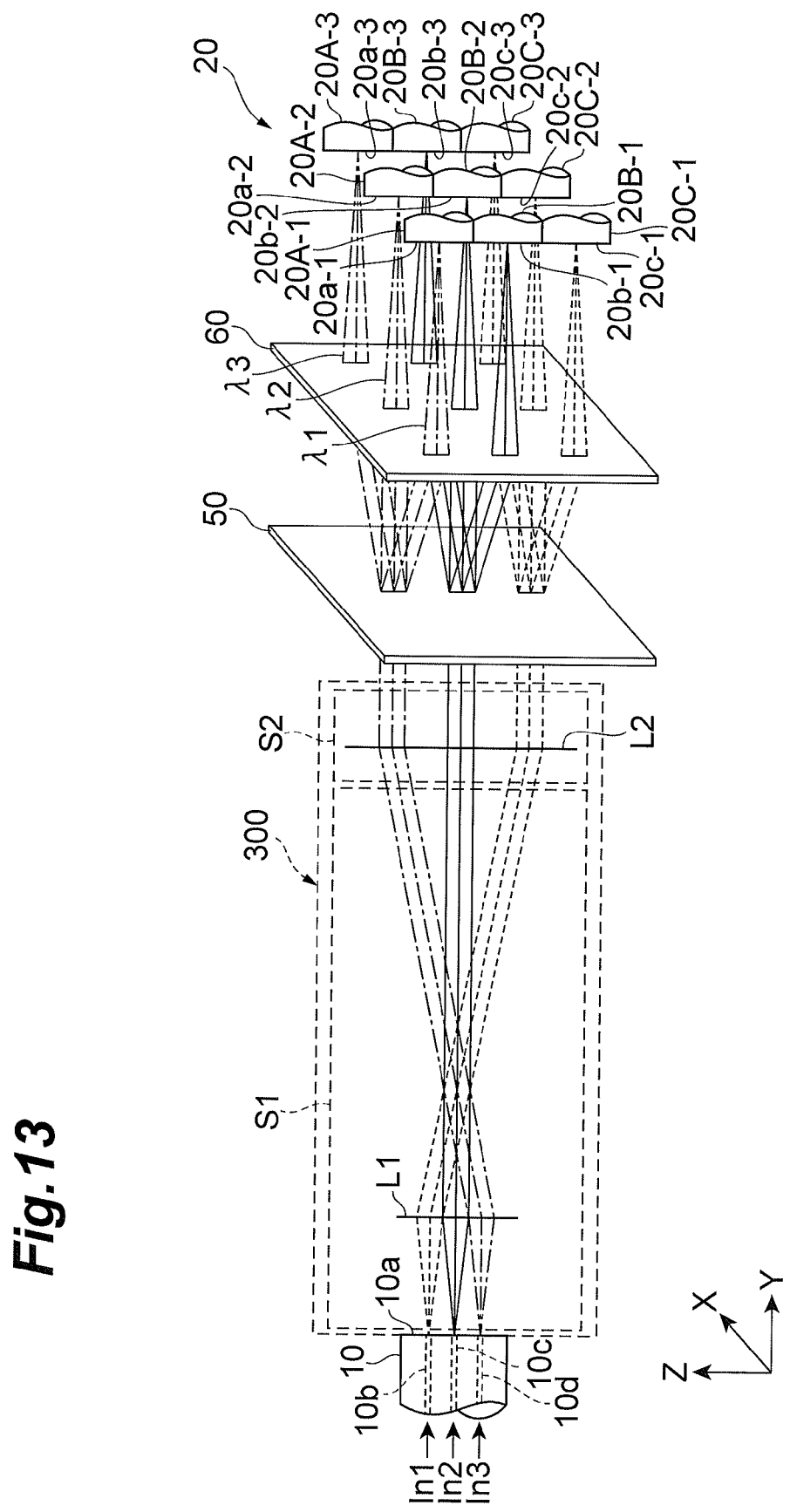
FIG. 13 is a schematic configuration diagram showing an optical device according to a seventh embodiment.

As shown in FIG. 13, the optical device 300 couples the multi-core fiber 10 (optical element) to the single core fibers 20 (other optical components) in order to transmit the wavelength multiplexed signal, and includes the first optical system S1 and the second optical system S2. Hereinafter, the optical device using the multi-core fiber as the optical element and being included in the present invention is referred to as the multi-core fiber coupling device. The multi-core fiber coupling device 300 optically couples the multi-core fiber 10 to the single core fibers 20 via a wavelength dispersive element 50 and a condensing lens 60.

Specifically, light beams incident on/emitted from cores of the multi-core fiber 10 are wavelength multiplexed light beams, and light beams incident on/emitted from cores of the single core fibers 20 are predetermined wavelength component signal light beams. In the case of using the multi-core fiber coupling device 300 as a demultiplexer, a wavelength multiplexed light beam emitted from each core of the multi-core fiber 10 are dispersed into predetermined wavelength component signals by the wavelength dispersive element 50, and the predetermined wavelength component signals are optically coupled to the respective single core fibers 20. In addition, in the case of using the multi-core fiber coupling device 300 as a multiplexer, beams emitted from each core of the single core fibers 20 are combined into a wavelength multiplexing signal light beam by the wavelength dispersive element 50, and the predetermined wavelength multiplexing signal light beam is optically coupled to the corresponding core of the multi-core fiber 10.

Figure 14:
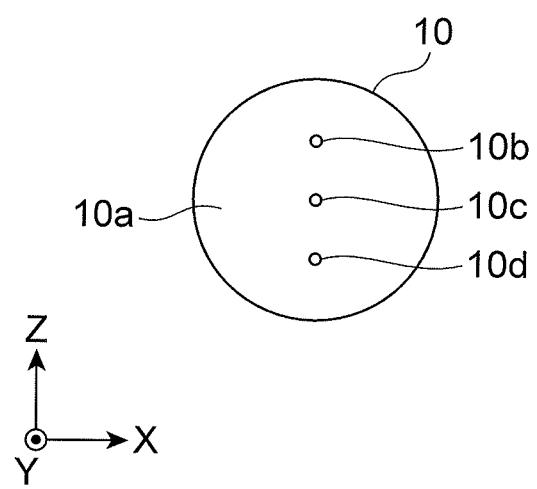
FIG. 14 is an end view showing a configuration of an end surface of a multi-core fiber (optical element).

The multi-core fiber 10 used in this embodiment has three cores 10b, 10c, and 10d, and three beams, optical axes of which are parallel to one another, are emitted from the emitting end surface 10a. More specifically, as shown in FIG. 14, the three cores 10b, 10c, and 10d are located at the central point of the end surface 10a and points above and below the central points, and are arranged along a Z direction in this figure. In the multi-core fiber 10, an interval between adjacent cores (that is, the beam interval on the emitting end surface 10a) is constant, and for example, is about 0.045 mm. Meanwhile, the cladding diameter of the multi-core fiber 10 is about $\phi$ 0.15 mm.

The first optical system S1 is located on the side of the multi-core fiber 10 and is configured to include one lens L1. The lens L1 is arranged so as to face the end surface 10a of the multi-core fiber 10 on the axial line of the emitting end of the multi-core fiber 10. As shown in FIG. 13, the lens L1 is arranged away from the end surface 10a of the multi-core fiber 10, by the focal length of the lens L1. The beams which are emitted from the cores of the multi-core fiber 10, and which have optical axes parallel to one another, are arranged so that optical axes are non-parallel to one another, by the lens L1. In a process of propagating a predetermined distance provided between the lens L1 and the second optical system S2, the intervals of the plurality of beams passing through the lens L1 are once reduced and then the plurality of beams is separated from one another in the Z direction, and the intervals of the beams are increased in the Z direction (alignment direction) as the beams are away from the first optical system S1.

The lens L1 may be any lens which changes the beams emitted from the respective cores of the multi-core fiber 10, having optical axes parallel to one another, into the beams exerting the action of making optical axes non-parallel to one another, such as a condensing lens. However, in the process of propagating a predetermined distance provided between the lens L1 and the second optical system S2, it is preferred that the plurality of beams passing through the lens L1 is approximately parallel to one another so as not to cause crosstalk, and the lens L1 is a collimating lens.

The second optical system S2 is located closer to the single core fibers 20 side and the wavelength dispersive element 50 side than the first optical system S1, and includes the lens L2. Like the lens L1, the lens L2 is arranged so as to face the end surface 10a of the multi-core fiber 10 on the axial line of the emitting end of the multi-core fiber 10. As shown in FIG. 1, the lens L2 is arranged away from the lens L1 by the sum of the focal length of the lens L1 and the focal length of the lens L2.

All of the plurality of beams passing through the lens L2, which are separated from one another by the lens L1, are deflected in a direction in which the beams are parallel to one another (that is, in this figure, the direction of a Y-axis orthogonal to the end surface 10a of the multi-core fiber 10, the direction in which the end surface 10a of the multi-core fiber 10 faces the end surfaces 20a of the single core fibers 20). The second optical system S2 spatially separates the deflected beams and introduces the beams into the wavelength dispersive element 50.

The lens L2 may be any lens which exerts the action of converting the beams converted so as to have the respective optical axes that are non-parallel to one another in the first optical system S1, into beams having optical axes that are parallel to one another. In contrast, since light beams emitted from the second optical system S2 are introduced into the wavelength dispersive element 50, it is preferred that the beams emitted from the second optical system S2 are parallel light beams. That is, when the lens L1 is the condensing lens, the lens L2 is preferably the collimating lens, and when the lens L1 is the collimating lens, the lens L2 is preferably a lens system formed of a plurality of (typically, two) collimating lenses, or a prism that deflects the beam travelling direction without changing the beam dispersion angle.

The wavelength dispersive element 50 is located between the multi-core fiber coupling device 300 and the single core fibers 20, and is constituted by a diffraction grating, for example. Like the lens L1 and the lens L2, the wavelength dispersive element 50 is arranged so as to face the end surface 10a of the multi-core fiber 10 on the axial line of the emitting end of the multi-core fiber 10. The wavelength dispersive element 50 is an element for dispersing incident wavelength multiplexed light into predetermined wavelength components (for example, $\lambda 1$, $\lambda 2$, $\lambda 3$), and is arranged relative to the multi-core fiber coupling device 300 such that a wavelength dispersion direction extends in an X direction in FIG. 1 (for example, a groove in the diffraction grating is formed in the Z direction). It should be noted that that the first optical system S1 of the multi-core fiber coupling device 300 is coupled to the multi-core fiber 10 such that a plurality of cores 10b to 10d of the multi-core fiber 10 is arranged in a direction that is non-parallel to a light dispersion direction of the wavelength dispersive element 50, that is, in the Z-axis direction vertical to the light dispersion direction.

As described above, in this embodiment, the alignment direction (Z direction) of the optical axes of the plurality of beams emitted from the plurality of cores 10b to 10d of the multi-core fiber 10 is different from the direction (X direction) in which input beams are dispersed by the wavelength dispersive element 50. Then, when the plurality of beams passing through the lens L2 is incident on the wavelength dispersive element 50, each wavelength multiplexed light beam is divided in the X-axis direction with respect to each predetermined wavelength components by the wavelength dispersive element 50. The light beam of each wavelength is incident on the condensing lens 60 by the light wavelength dispersive element 50.

The condensing lens 60 is located between the wavelength dispersive element 50 and the single core fibers 20, and is arranged so as to face the wavelength dispersive element 50 so as to condense each incident predetermined wavelength component light beam on a predetermined focal point. The condensing lens 60 is arranged away from the end surfaces 20a-1 to 3, 20b-1 to 3, and 20c-1 to 3 of the single core fibers 20A-1 to 3, 20B-1 to 3, and 20C-1 to 3 by the focal length of the condensing lens 60. Then, the beams passing through the condensing lens 60 are incident on the single core fibers 20A-1 to 3, 20B-1 to 3, and 20C-1 to 3.

The single core fibers 20 is arranged so as to be optically coupled to the predetermined wavelength component signal light beams emitted from the wavelength dispersive element 50 via the condensing lens 60. That is, the same number of fibers 20A-1 to 3, 20B-1 to 3, and 20C-1 to 3 as a product of the number of the cores 10b, 10c, and 10d of the multi-core fiber 10 and the number of the predetermined wavelength component signal light beams of the predetermined wavelength component signals are prepared. These nine single core fibers 20A-1 to 3, 20B-1 to 3, and 20C-1 to 3 are arranged so as to have respective optical axes approximately parallel to one another. TEC fibers (Thermally-diffused Expanded Core Fiber) having an end with locally-extended mode field diameter (MFD) to extend tolerance at the time of mounting may be used as the single core fibers 20.

In the typical example shown in FIG. 13, the light-receiving end surfaces 20a-1 to 3, 20b-1 to 3, and 20c-1 to 3 are arranged in the same plane in parallel with the emitting end surface 10a of the multi-core fiber 10. In addition, their ends are not inclined relative to the multi-core fiber 10, and are arranged in parallel with the extending direction of the multi-core fiber 10. Although the optical axis of the multi-core fiber 10 is parallel to the optical axes of the single core fibers 20A-1 to 3, 20B-1 to 3, and 20C-1 to 3, the configuration can be appropriately changed depending on the design of the optical system.

As described above, in the multi-core fiber coupling device 300, the beams (wavelength multiplexed light beams) which have the optical axes approximately parallel to one another, and which are emitted from the cores 10b to 10d of the multi-core fiber 10, having the optical axes approximately parallel to one another, are made in a state of being separated from one another by making the optical axes of the beams non-parallel to one another by the first optical system S1 on the side of the wavelength dispersive element 50 of the optical system S1, and the optical axes of the beams are made in a state of being approximately parallel to one another by the second optical system S2 on the side of the wavelength dispersive element 50 of the optical system S2. Then, the beams having the optical axes that are made in a state of being approximately parallel to one another are introduced into the wavelength dispersive element 50. In this manner, since the optical axes of the beams are made in a state of being approximately parallel to one another on the side of the wavelength dispersive element 50 of the second optical system S2, wavelength multiplexing and demultiplexing can be easily performed by a simple method of arranging the single wavelength dispersive element 50 on the optical paths. In this case, since the single core fibers 20A-1 to 3, 20B-1 to 3, and 20C-1 to 3 need not be inclined relative to the multi-core fiber 10, angular adjustment becomes unnecessary and high practicality can be achieved.

Furthermore, in the multi-core fiber coupling device 300, the alignment direction (Z-axis) of the optical axes of the plurality of beams emitted from the plurality of cores 10b to 10d of the multi-core fiber 10 is different from the light dispersion direction (X-axis) in which each beam is dispersed by the wavelength dispersive element 50. For this reason, even when the wavelength of each beam is dispersed by the wavelength dispersive element 50, the multi-core fiber coupling device 300 can suppress the occurrence of crosstalk or the like between the dispersed wavelengths. As in the multi-core fiber 10, especially when the interval between the cores 10b to 10d is small (typically, when the interval between the optical axes is 100 μm or less, more preferably, 50 μm or less, it is especially effective. About 0.045 mm in this embodiment), such crosstalk is easy to occur. Thus, this embodiment can preferably prevent the occurrence of crosstalk.

Meanwhile, the optical demultiplexer is made up of the multi-core fiber coupling device 300 and the wavelength dispersive element 50 described above. In transmitting the light signal from the single core fibers 20A-1 to 3, 20B-1 to 3, and 20C-1 to 3 to the multi-core fiber 10, the optical multiplexer is constituted from the multi-core fiber coupling device 300 and the wavelength dispersive element 50 or the like.

In the above-mentioned embodiment, although the plurality of beams from the multi-core fiber 10 are separated from one another by the lens L1 of the first optical system S1, the plurality of beams can be separated from one another also in the mode as shown in FIGS. 3A and 3B. In FIG. 3A, by subjecting the end surface 10a to an end surface treatment not shown, beams are adjusted in the beam-emitting directions separated from one another. More specifically, by curving or chamfering the end surface 10a, the end surfaces of the core regions surrounding the end surface of the central core region are inclined relative to the end surface of the central core region to adjust the beam-emitting directions. At this time, when an inclination angle of the end surface of each core region is set to be an angle that is twice as large as the beam spread angle or more, the adjacent beams do not cross each other. By adopting the collimating lens as the lens L2, parallel light beams having the optical axes that are parallel to one another can be introduced into the wavelength dispersive element 50.

Alternatively, as shown in FIG. 3B, the two glass blocks G1 and G2 are arranged in association with the surrounding cores, and beams from the surrounding the cores can be refracted at the glass blocks, thereby separating the plurality of beams from the multi-core fiber 10 from each other. For example, when the beam interval is 0.045 mm and the numerical aperture (NA) is 0.1, the inclination angle θ of the glass blocks G1 and G2 can be set to 30 degrees and the length D of the glass block can be set to about 10 μm. Meanwhile, in the modifications shown in FIGS. 3A and 3B as described above, the end surface 10a and the glass blocks G1 and G2 constitute the first optical system S1.

[Eighth Embodiment] Next, a multi-core fiber coupling device 300A as an optical device according to the seventh embodiment will be described with reference to FIG. 15. Although the wavelength dispersive element 50, the condensing lens 60 and the single core fibers 20 are not shown in FIG. 15, these components are the same as those in the seventh embodiment.

Figure 15:
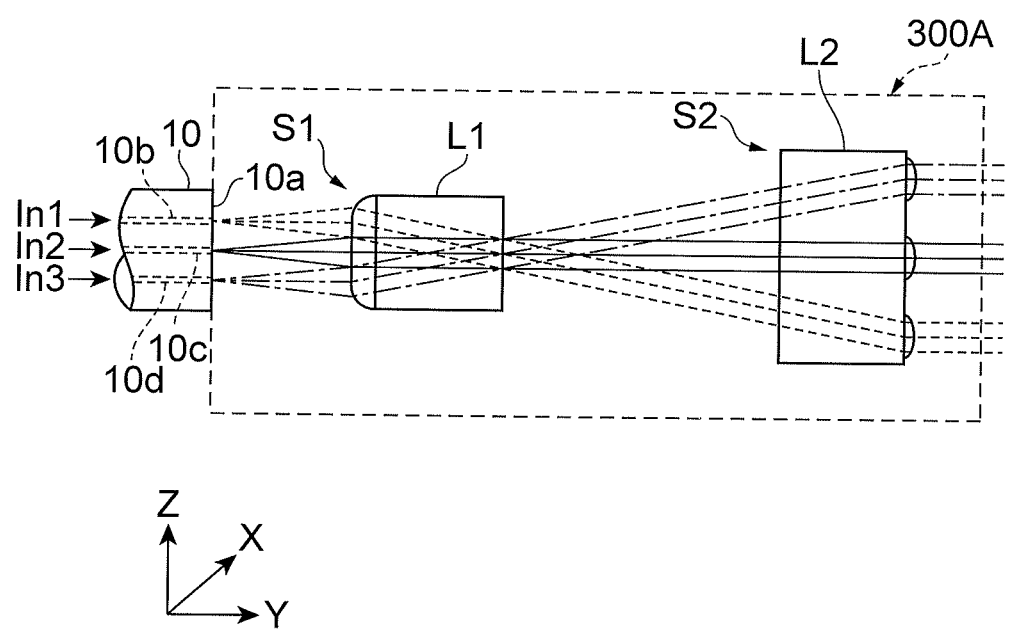
FIG. 15 is a schematic configuration diagram showing an optical device according to an eighth embodiment.

As shown in FIG. 15, the multi-core fiber coupling device 300A as an optical device according to the seventh embodiment is different from the multi-core fiber coupling device 300 according to the seventh embodiment in configurations of the first and second optical systems S1 and S2. That is, the first optical system S1 of the multi-core fiber coupling device 300A is constituted by a GRIN lens (Graded Refractive Index lens) as a monocular lens. In the case of using the GRIN lens L1 as the first optical system S1, by previously polishing the end surface 10a of the multi-core fiber 10 and the end surface of the GRIN lens L1 to be vertical to the optical axis, angular adjustment of the multi-core fiber 10 and the GRIN lens L1 is not required, and only displacement of the optical axis needs to be adjusted. Further, by bringing the end surface 10a of the multi-core fiber 10 into contact with the end surface of the GRIN lens L1 or integrating the end surfaces, reflection on the end surface of the multi-core fiber and the end surface of the GRIN lens L1 on the side of the multi-core fiber can be suppressed.

Furthermore, the second optical system S2 of the multi-core fiber coupling device 300A is constituted by an ommateal lens L2. As in the seventh embodiment, the ommateal lens L2 emits the plurality of beams separated from one another on the side of the first optical system S1 so as to become beams that are approximately parallel to optical axis of the multi-core fiber on the side of the wavelength dispersive element 50.

Such multi-core fiber coupling device 300A can also obtain the same or similar effects as those in the multi-core fiber coupling device 300 according to the seventh embodiment.

[Ninth Embodiment] Subsequently, a multi-core fiber coupling device 300B as an optical device according to the ninth embodiment will be described with reference to FIG. 16.

Figure 16:
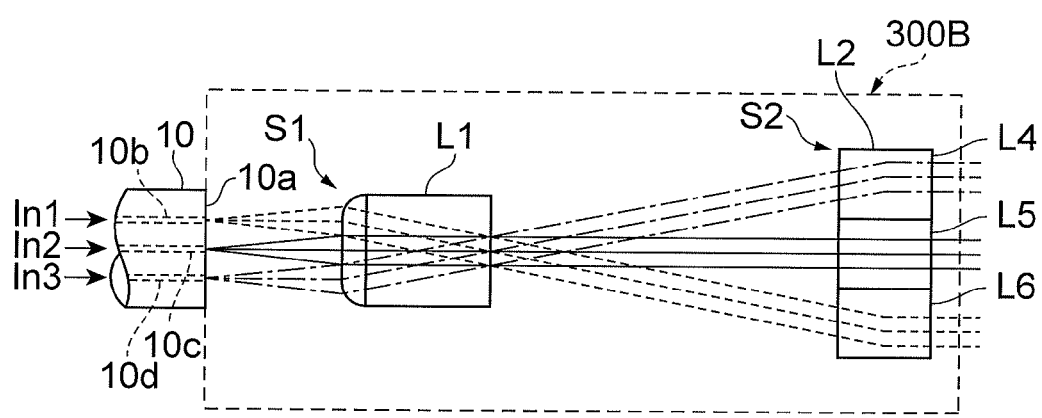
FIG. 16 is a schematic configuration diagram showing an optical device according to a ninth embodiment.

As shown in FIG. 16, the multi-core fiber coupling device 300B is different from the multi-core fiber coupling device 300A according to the eighth embodiment only in the second optical system S2.

The second optical system S2 of the multi-core fiber coupling device 300B is constituted by the lens array L2. The lens array L2 are constituted by three lenses L4 to L6 corresponding to the three beams. As in the above-mentioned embodiments, the lens array L2 emits the plurality of beams separated from one another on the side of the first optical system S1 so as to become beams that are approximately parallel to optical axis of the multi-core fiber on the side of the wavelength dispersive element 50 by using the three lenses L4 to L6.

Such multi-core fiber coupling device 300B can also obtain the same or similar effect as that of the multi-core fiber coupling device 300 according to the seventh embodiment. In addition, in the lens array L2 with such configuration, one part is changed from remaining parts in position relative to the single core fibers 20, and the aberration of the second optical system S2 may be corrected. That is, since the lens located lateral to the center among the respective lenses constituting the lens array L2 condense light in front of the single core fibers 20 arranged such that their end surfaces are aligned, by protruding the laterally located lenses toward the single core fibers 20, it is preferred that beams passing through the laterally located lenses are formed so as to be focused on the end surfaces of the single core fibers 20. It should be noted that the aberration may be corrected by changing, to other part, position of one part of the lens array relative to the core fibers 20 in the second optical system S2 as described above, or by changing a planar shape of the integrated lens. Furthermore, the aberration may be corrected by varying the refractive index of the integrated lens at the central area and at side areas lateral to the central area.

[Tenth Embodiment] Next, an optical device 300C according to the tenth embodiment will be described with reference to FIG. 17.

Figure 17:
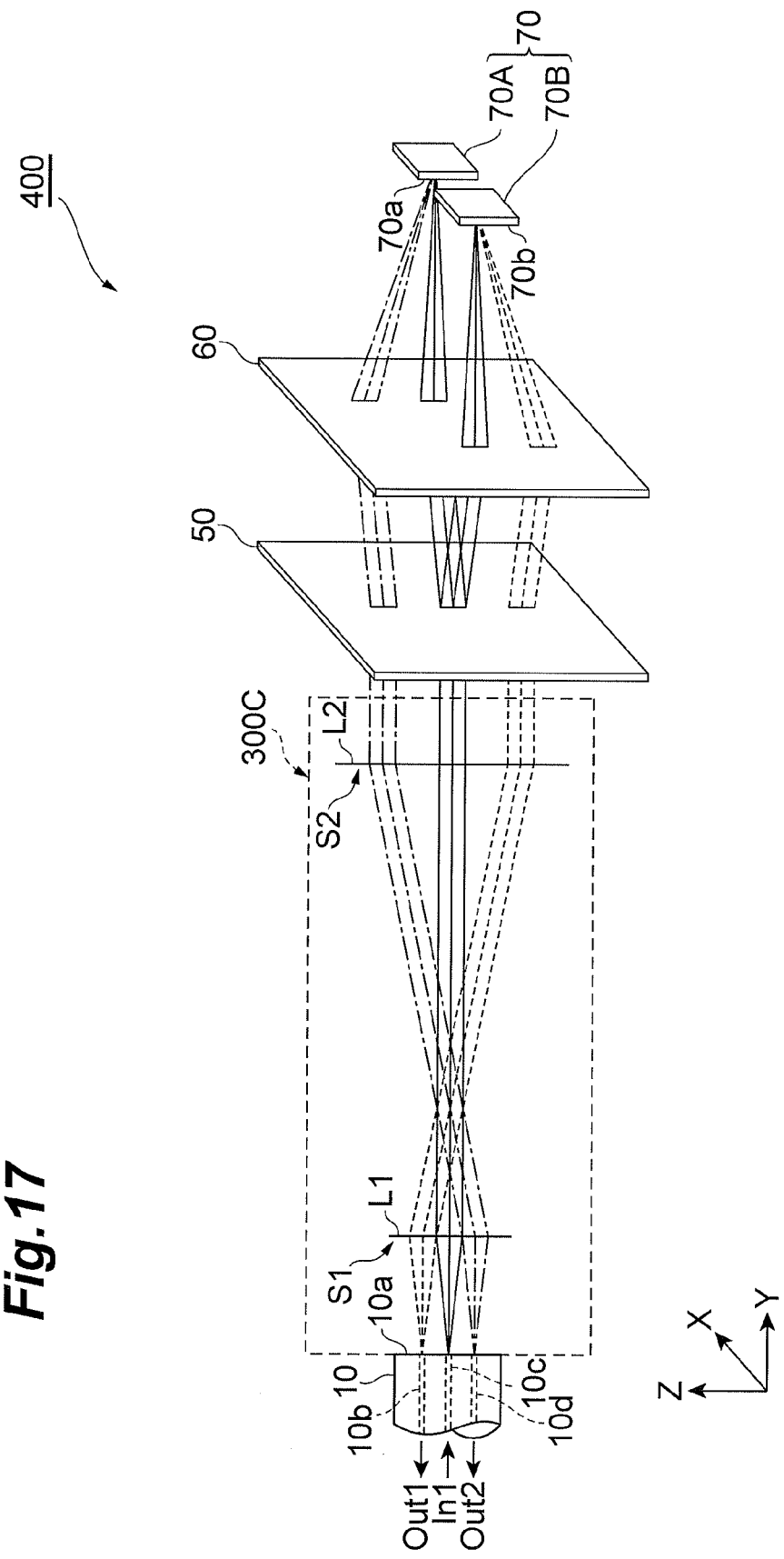
FIG. 17 is a schematic configuration diagram showing an optical device according to a tenth embodiment.

FIG. 17 shows a wavelength selective switch 400 including the optical device according to the present invention. The wavelength selective switch 400 includes a multi-core fiber 10 having a plurality of light input/output parts having respective optical axis that are parallel to one another, the optical device 300C, the wavelength dispersive element 50, the condensing lens 60 and a spatial modulating element 70. With the configuration shown in FIG. 17, the optical device 300C is optically coupled to the wavelength dispersive element 50, the condensing lens 60 and the spatial modulating element 70.

The optical device 300C may be the multi-core fiber coupling device having the same configuration as that is the seventh embodiment, and in FIG. 17, the multi-core fiber coupling device 300C is applied as the wavelength selective switch. That is, the wavelength selective switch 400 includes the multi-core fiber 10 having the plurality of light input/output parts, and the cores 10b to 10d as the plurality of light input/output parts form an input port In1 that receives an input of wavelength multiplexed light and a plurality of output ports Out1, Out2 that output predetermined wavelength component signal light.

The beam (wavelength multiplexed light) that is incident from the core 10c of the multi-core fiber 10 (In1 in FIG. 17) and emitted from the multi-core fiber coupling device 300C is dispersed by the wavelength dispersive element 50, and the spatial modulating element 70 is irradiated with predetermined wavelength component signals via the condensing lens 60. The spatial modulating element 70 is provided in response to the predetermined wavelength component signal light and has an optical path converting function capable of switching each wavelength component toward the predetermined output port. As the spatial modulating element 70, an MEMS mirror capable of mechanically switching the optical path of the predetermined wavelength component signal light by electrical driving, and a liquid crystal spatial modulating element (for example, LCoS) capable of changing the refractive index by application of voltage to convert the optical path can be used.

The spatial modulating element 70 shown in FIG. 17 is the MEMS mirror, and includes a plurality of MEMS mirrors 70A, 70B in the light dispersion direction of the wavelength multiplexed light in the wavelength dispersive element 50. The MEMS mirrors 70A, 70B are mirrors that rotate in a two-axes direction in an XZ plane to change the inclination angle, thereby switching the optical path of reflected light, and the beams, with which the end surface 70a, 70b of the MEMS mirrors 70A, 70B were irradiated are reflected by a predetermined angle, and return to the second optical system S2 again through the condensing lens 60 and the wavelength dispersive element 50.

Then, the two beams returned to the second optical system S2 are focused at the first optical system S1 and are incident on the cores 10b, 10d of the multi-core fiber 10 (Out 1, 2 in FIG. 17). In this manner, in this embodiment, predetermined selected wavelength can be extracted from the incident light.

As described above, in multi-core fiber coupling device 300C, as in the seventh embodiment, the optical paths of the beams are made in a state of being separated from one another by the first optical system S1 on the side of the wavelength dispersive element 50 of the optical system S1, and the optical axes of the means are made in a state of being approximately parallel to one another by the second optical system S2 on the side of the wavelength dispersive element 50 of the optical system S2. Then, the beams having the optical axes that are approximately parallel to one another are introduced into the wavelength dispersive element 50, or the beams from the wavelength dispersive element 50 are made incident on the second optical system S2. In this way, since the optical paths of the beams are made in a state of being approximately parallel to the optical axis of the multi-core fiber 10 on the side of the wavelength dispersive element 50 of the second optical system S2, wavelength multiplexing and demultiplexing can be easily performed by a simple method of arranging the single wavelength dispersive element 50 on the optical paths.

Furthermore, in the multi-core fiber coupling device 300C, the alignment direction (Z-axis) of the optical axes of the plurality of beams emitted from/incident on the plurality of cores 10b to 10d of the multi-core fiber 10 is different from the light dispersion direction (X-axis) in which each beam is dispersed by the wavelength dispersive element 50. For this reason, even when the wavelength of each beam is dispersed by the wavelength dispersive element 50, the multi-core fiber coupling device 300C can suppress the occurrence of crosstalk or the like between the dispersed wavelengths.

[Eleventh Embodiment] Next, a multi-core fiber coupling device according to the eleventh embodiment will be described with reference to FIG. 18.

Figure 18:
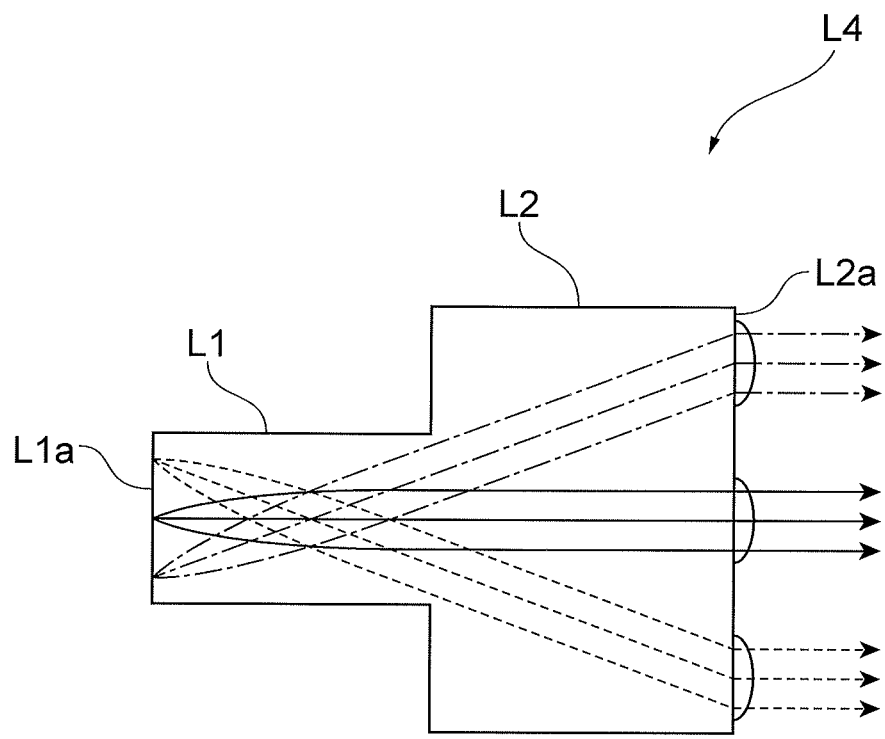
FIG. 18 is a schematic configuration diagram showing an optical device according to an eleventh embodiment.

As shown in FIG. 18, the multi-core fiber coupling device according to this embodiment is different from the multi-core fiber coupling device 300 and the like according to the above-mentioned embodiments in that it includes an integration member L20. The integration member L20 is a member for integrating the Lens L1 configuring the first optical system S1 and the lens L2 configuring the second optical system S2 as one optical component, and for holding relative position between the first optical system S1 and the second optical system S2. The integration member L20 has one end surface L1a optically coupled to the multi-core fiber 10, and the other end surface L2a optically coupled to the wavelength dispersive element 50.

Meanwhile, the integration member L20 may be deformed such that air is interposed between the first optical system S1 (L1) and the second optical system S2 (L2), or such that another translucent material is interposed between the first optical system S1 (L1) and the second optical system S2 (L2). In the case where a solid member made of a translucent material is interposed between the first and second optical systems S1, S2, the first and second optical systems S1, S2 and the solid member made of the translucent material can be integrated.

Moreover, the present invention is not limited to the above-mentioned embodiments, and may be variously modified. For example, in the above-mentioned embodiments, the coupling device which makes light emitted from the multi-core fibers incident on the single core fibers is explained, but to the contrary, the utilization as the coupling device which makes light emitted from the single core fibers incident on the multi-core fibers is also possible.

Figure 19:
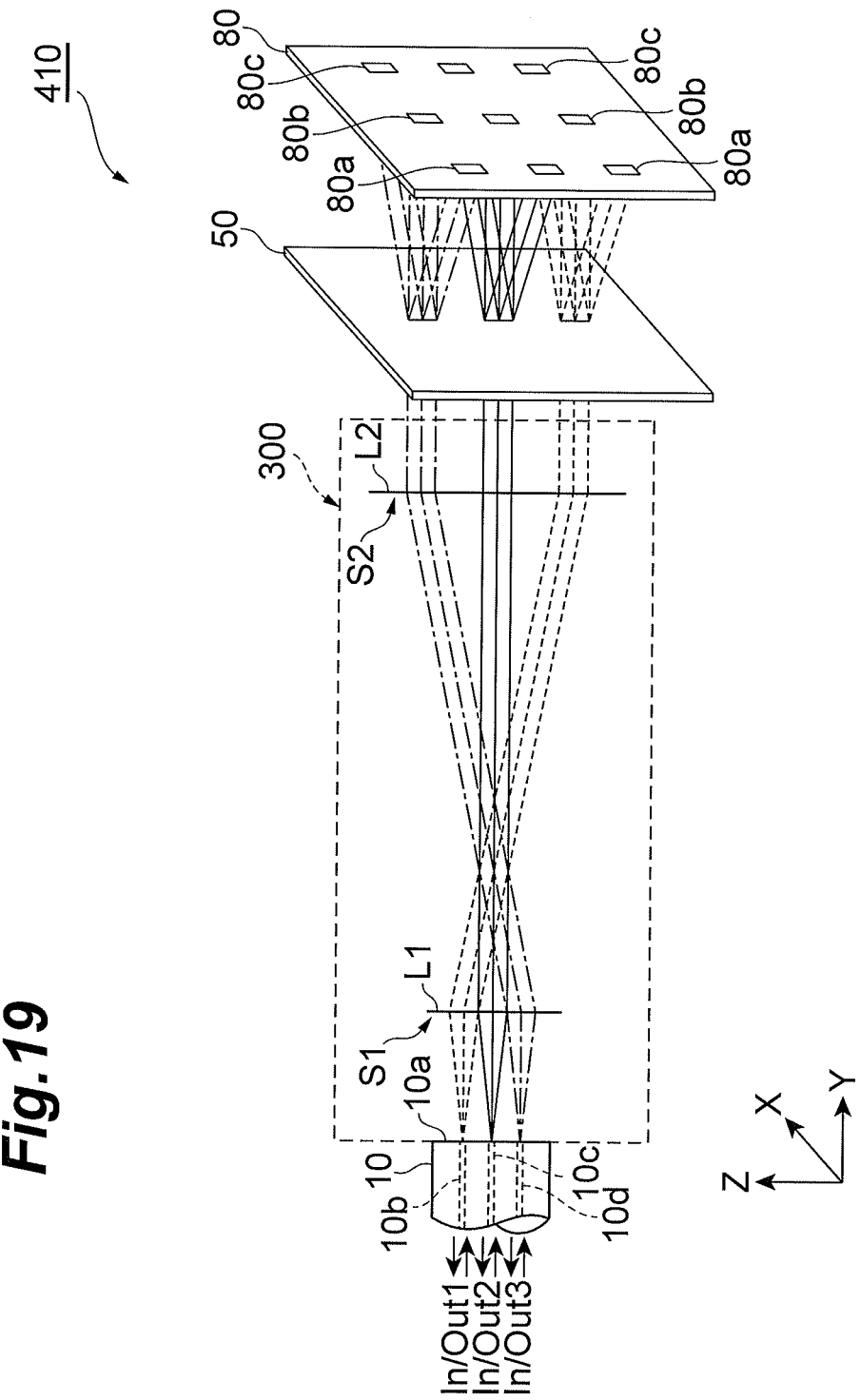
FIG. 19 is a view showing an example in which the optical device is applied to a wavelength blocker.

In addition, in the above-mentioned embodiments, the cases where the optical device of the present invention is coupled to the single core fibers and where the optical device is used as the wavelength selective switch, as shown in FIG. 19, the optical device 300 may be applied as a wavelength blocker. In a reflection-type wavelength blocker 410 shown in FIG. 19, a two-dimensionally spreading shielding element array 80 in place of the spatial modulating element 70 in the wavelength selective switch 400 is arranged so as to face the wavelength dispersive element 50. The wavelength blocker 410 includes the multi-core fiber 10 as an optical element having a plurality of light incoming/emitting parts having respective optical axes that are parallel to each other, and the cores 10b to 10d as the plurality of light incoming/emitting parts form In/Out 1 to 3 that input and output wavelength multiplexed light.

A beam (wavelength multiplexed light) that is incident from each of the cores 10b to 10d of the multi-core fiber 10 and emitted from the multi-core fiber coupling device 300 is dispersed by the wavelength dispersive element 50, and the predetermined wavelength component signals are radiated to the shielding element array 80. The shielding element array 80 acts to remove an optical component at a predetermined position by electrical driving, and unremoved wavelength component signals are regular-reflected on the shielding element array 80 and are incident on the multi-core fiber 10 again. Such optical system is realized by combination of a polarizer, a liquid crystal element and a mirror.

Although the reflection-type wavelength blocker 410 is used in the above-mentioned example, a transmission-type wavelength blocker may be configured. In this case, the reflection type wavelength blocker 410 may be formed symmetrically about the shielding element array 80. At this time, no reflection mirror is arranged in the rear of windows 80a to 80c. The shielding factor of the window corresponding to predetermined wavelength component light beams to be removed from wavelength multiplexed light beams inputted from the input-side optical system (multi-core fiber 10 (cores 10b to 10d (In1 to 3)), the multi-core fiber coupling device 300 and the wavelength dispersive element 50 is increased to block the predetermined wavelength component light beams, which is arranged on the left side. By brining the liquid crystal of the windows 80a to 80c into a polarizing state where light beams can transmit, the transmitted light beams are incident on the output-side optical system having the same configuration as the input-side optical system, are combined by the wavelength dispersive element 50 on the output side, and are incident on the respective cores 10b to 10d (Out1 to 3) in the multi-core fiber 10 through the first optical system S1. In this manner, the wavelength multiplexed light beams from which the predetermined wavelength component light beams are removed can be obtained.

Figure 20:
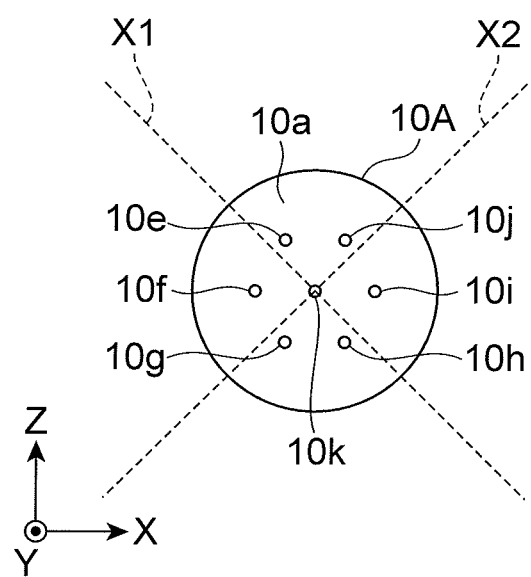
FIG. 20 is an end view showing a configuration of an end surface of another multi-core fiber (optical element).

Although the number of the cores 10b to 10d of the multi-core fiber 10 and the number of the single core fibers 20 each are three in the above-mentioned embodiments, the number is limited to three, and can be increased or decreased as necessary. For example, the multi-core fiber having one-dimensionally arranged cores is used in the above-mentioned example as shown in FIG. 20. However, a multi-core fiber 10A having two-dimensionally arranged seven cores 10e to 10k and seven single core fiber corresponding to the cores may be used. At this time, the multi-core fiber 10 in this embodiment may be used. In this case, it is preferred that each core is arranged in non-parallel to the light dispersion direction of the wavelength dispersive element, and for example, as illustrated, only one core exists in the light dispersion direction (directions X1 and X2).

Furthermore, specific size and material of each of the above-mentioned components can be changed in design as necessary. In addition, although the multi-core fiber each including the plurality of cores is used as the optical element including the plurality of light input/output parts having the respective optical axes that are parallel to each other, a fiber array configured by arranging a plurality of fibers each having a single core one-dimensionally in an array, a fiber bundle configured by bundling a plurality of optical fibers each having a single core two-dimensionally, or an optical element configured by arranging light-emitting parts and light receiving parts two-dimensionally (for example, a VCSEL array, a PD array) can be used as an equivalent of the multi-core fiber 10 in the above-mentioned embodiments. A GRIN lens may be used as the second optical system S2. An array waveguide diffraction grating (AWG) may be adopted as the wavelength dispersive element.

Furthermore, in the above-mentioned embodiments, to make the alignment direction of the optical axes of the plurality of beams incident on or emitted from the plurality of cores 10b to 10d of the multi-core fiber 10 different from the light dispersion direction in which the beam is dispersed by the wavelength dispersive element 50, the first optical system S1 is coupled to the multi-core fiber 10 such that the plurality of cores 10b to 10d of the multi-core fiber 10 are arranged in the direction that is non-parallel to the light dispersion direction of the wavelength dispersive element 50. However, any of the above-mentioned coupling devices may be provided with a mirror that bends spatial coordinates of the plurality of beams incident on or emitted from the wavelength dispersive element 50 such that the alignment direction of the optical axes of the plurality of beams incident on or emitted from the plurality of cores 10b to 10d of the multi-core fiber 10 is different from the light dispersion direction in which the beam is dispersed by the wavelength dispersive element 50. This configuration will be described with reference to FIG. 21.

Figure 21:
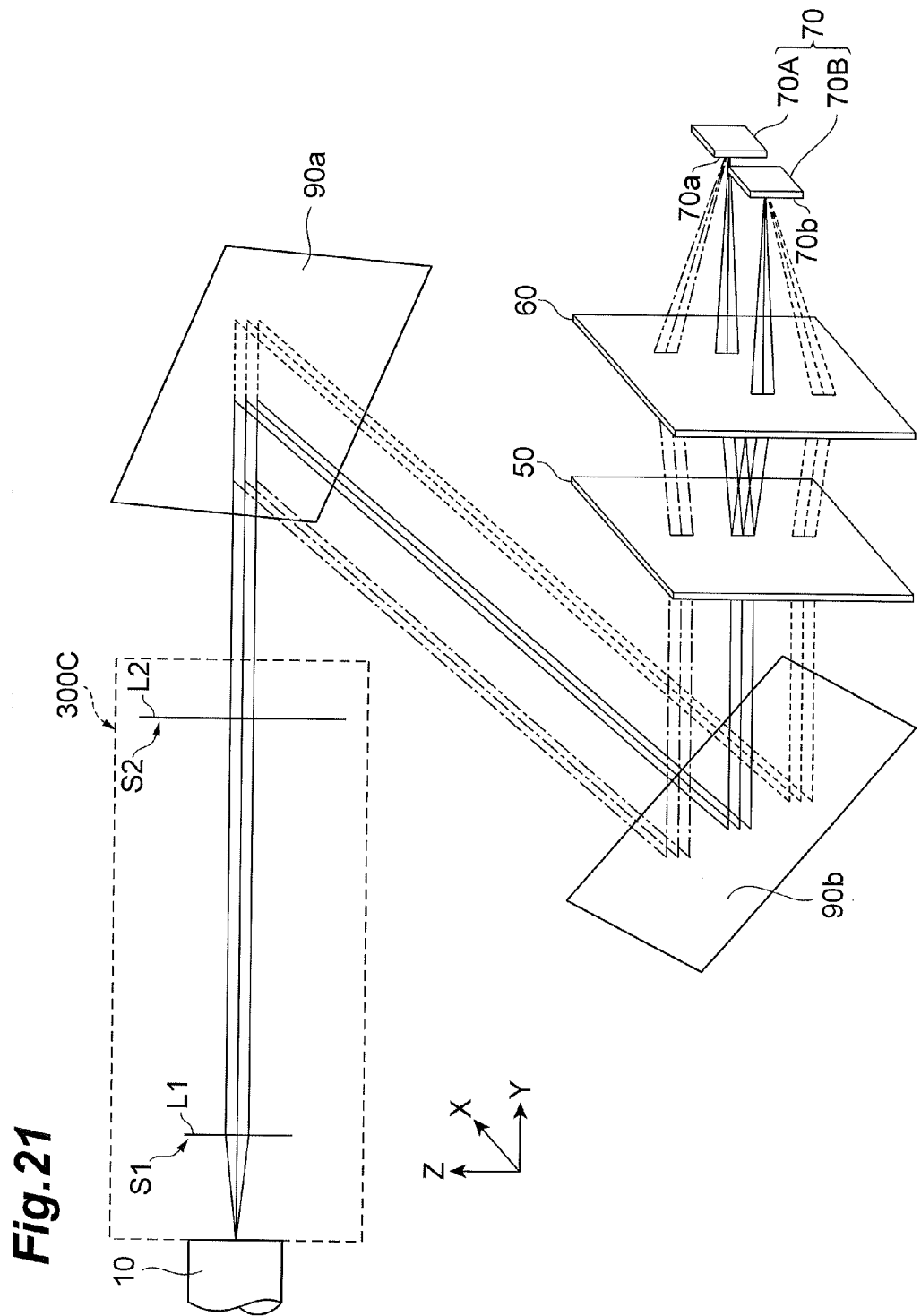
FIG. 21 is a schematic configuration diagram showing an optical device according to another optical device.

FIG. 21 is a schematic configuration diagram showing an optical device according to another embodiment. As shown in FIG. 21, mirrors 90a, 90b are arranged on the optical paths of the plurality of beams between the second optical system S2 and the wavelength dispersive element 50 in the optical device 300C. In the optical device 300C shown in FIG. 21, beams are emitted from three cores 10b, 10c, and 10d of the multi-core fiber 10 along the depth direction of this figure. That is, the configuration when viewed in the Z direction in FIG. 21 is similar to the optical device 300C shown in FIG. 17.

The mirror 90a bends spatial coordinates of the plurality of beams ((x:y:z)=(0°:90°:90°)) emitted from the second optical system S2 to produce beams ((x:y:z)=(45°:45°:45°)). The mirror 90b bends spatial coordinates of the beams bent by the mirror 90a to produce beams ((x:y:z)=(90°:0°:0°)). That is, the mirrors 90a and 90b bend the spatial coordinates of the three beams emitted from the second optical system S2 (optical device 300C) in the depth direction (X direction) in this figure such as the three beams are incident on the wavelength dispersive element 50 along the vertical direction (Z direction) in this figure.

What is claimed is:

1. An optical device which couples an optical element to another optical component, the optical element including a plurality of light input/output parts emitting a plurality of beams having an interval and optical axes parallel to each other, the optical device comprising:
    a first optical system including a lens which collimates the plurality of beams emitted from the plurality of light input/output parts of the optical element, makes the respective optical axes of the beams non-parallel to each other, and allows the beams to propagate a predetermined distance such that the interval of the beams emitted from the lens is greater than the interval of the beams when emitted from the optical element; and
    a second optical system which receives the plurality of collimated beams and makes their optical axes substantially parallel to each other.

2. The optical device according to claim 1, further comprising:
    a wavelength dispersive element which is located between the second optical system and the other optical component,
    wherein the optical element is coupled with the other optical component via the wavelength dispersive element.

3. The optical device according to claim 2,
    wherein the optical element is a multi-core fiber including a plurality of cores as the plurality of light input/output parts,
    wherein each core is arranged in non parallel to a light dispersion direction in which the beams are dispersed by the wavelength dispersive element.

4. The optical device according to claim 2, further comprising a mirror arranged on the optical paths of the plurality of beams, wherein the optical element is a multi-core fiber including a plurality of cores as the plurality of light input/output parts, wherein each core is arranged in parallel to a light dispersion direction in which the beams are dispersed by the wavelength dispersive element, wherein the mirror bends the optical paths incident on the wavelength dispersive element such that an alignment direction of the optical paths is non-parallel to the light dispersion direction.

5. The optical device according to claim 1, wherein the interval is 100 μm or less.

6. The optical device according to claim 1, wherein the optical element is a multi-core fiber including a plurality of cores as the plurality of light input/output parts, and the interval is 50 μm or less.

7. An optical multiplexer or an optical demultiplexer that includes the optical device according to claim 2.

8. A wavelength selective switch including the optical device according to claim 2, wherein the plurality of light input/output parts includes at least one input port and output port, and the other optical component is a spatial modulating element that deflects a wavelength component which is dispersed by the wavelength dispersive element toward the output port.

9. A wavelength blocker including the optical device according to claim 2, wherein the plurality of light input/output parts includes at least one input port and/or output port, wherein the other optical component is a shielding element that shields a wavelength component which is dispersed by the wavelength dispersive element.

10. The optical device according to claim 1, wherein the first optical system is a monocular lens.

11. The optical device according to claim 1, wherein the second optical system is an ommateal lens including a plurality of optical elements corresponding to each of the beams.

12. The optical device according to claim 11, wherein one of the optical elements is changed from others in position relative to the other optical component for correcting an aberration of the second optical system.

13. The optical device according to claim 1, further comprising a member for keeping a relative position between the first optical system and the second optical system.

14. The optical device according to claim 1, wherein
at least one of the first and second optical systems is a GRIN lens.

15. The optical device according to claim 1,
wherein the optical element is a multi-core fiber including a plurality of cores as the plurality of light input/output parts,
wherein the other optical component is a plurality of single core fibers including one core corresponding to each of the beams,
wherein a focal length of the first optical system is substantially equal to a focal length of the second optical system.

16. The wavelength selective switch according to claim 8, wherein the optical element is a multi-core fiber including a plurality of cores providing the input port and the output port.

17. The optical device according to claim 13, wherein the member is a glass block.

18. The optical device according to claim 1, wherein the predetermined distance is included between the first optical system and the second optical system.

19. The optical device according to claim 1,
wherein the second optical system includes an element for converting the beams having non-parallel optical axes emitted by the first optical system into beams having parallel optical axes,
and the optical device further comprising a condensing lens for condensing the converted beams toward the other optical component.

20. The optical device according to claim 19, wherein the element includes lens or prism.

* * * * *